(12) United States Patent
Yusuf et al.

(10) Patent No.: US 10,808,186 B2
(45) Date of Patent: Oct. 20, 2020

(54) SYSTEMS AND METHODS FOR SEPARATION AND EXTRACTION OF HETEROCYCLIC COMPOUNDS AND POLYNUCLEAR AROMATIC HYDROCARBONS FROM A HYDROCARBON FEEDSTOCK

(71) Applicant: Saudi Arabian Oil Company, Dhahran (SA)

(72) Inventors: Zaki Yusuf, Dhahran (SA); Ahmad D. Hammad, Dhahran Hills (SA); Alberto Lozano Ballesteros, Dhahran Hills Camp (SA)

(73) Assignee: Saudi Arabian Oil Company, Dhahran (SA)

( * ) Notice: Subject to any disclaimer, the term of this patent is extended or adjusted under 35 U.S.C. 154(b) by 145 days.

(21) Appl. No.: 15/861,105

(22) Filed: Jan. 3, 2018

(65) Prior Publication Data

US 2018/0187104 A1    Jul. 5, 2018

Related U.S. Application Data

(60) Provisional application No. 62/442,003, filed on Jan. 4, 2017.

(51) Int. Cl.
*C10G 67/04* (2006.01)
*C10G 53/06* (2006.01)
(Continued)

(52) U.S. Cl.
CPC ......... *C10G 67/049* (2013.01); *C10G 21/003* (2013.01); *C10G 21/08* (2013.01);
(Continued)

(58) Field of Classification Search
CPC ........ C10G 21/00; C10G 21/02; C10G 21/08; C10G 21/16; C10G 53/04; C10G 53/06;
(Continued)

(56) References Cited

U.S. PATENT DOCUMENTS

| 4,746,420 A | 5/1988 | Darian et al. |
| 6,183,521 B1 | 2/2001 | Lin et al. |

(Continued)

FOREIGN PATENT DOCUMENTS

| CN | 103214332 A | 7/2013 |
| WO | 2000056842 | 9/2000 |

(Continued)

OTHER PUBLICATIONS

International Search Report and Written Opinion dated Jun. 12, 2018 pertaining to International Application No. PCT/US2018/012172.

*Primary Examiner* — Prem C Singh
*Assistant Examiner* — Brandi M Doyle
(74) *Attorney, Agent, or Firm* — Dinsmore & Shohl LLP

(57) ABSTRACT

Methods of extracting 1-4 cycle heterocyclic compounds and 2-5 cycle polynuclear aromatic hydrocarbons from a hydrocarbon feedstock are described. The methods include providing a hydrocarbon feedstock containing crude oil fractions, and determining an A/R ratio and an asphaltene concentration of the hydrocarbon feedstock. Based upon the A/R ratio and the asphaltene concentration, the treatable hydrocarbon feedstock undergoes one or more of cracking and fractionating. Subsequently, at least one targeted portion of the heterocyclic compounds is extracted from the fractionated stream with an aqueous solvent. A stream containing the 2-5 cycle polynuclear aromatic hydrocarbons is transferred to an extractor and the 2-5 cycle polynuclear (Continued)

aromatic hydrocarbons are extracted with a solvent system comprising an aprotic solvent.

20 Claims, 10 Drawing Sheets

(51) Int. Cl.
    *C10G 51/02* (2006.01)
    *G01N 7/06* (2006.01)
    *C10G 21/16* (2006.01)
    *C10G 21/08* (2006.01)
    *C10G 55/02* (2006.01)
    *C10G 21/00* (2006.01)
    *C10G 21/20* (2006.01)

(52) U.S. Cl.
    CPC ............. *C10G 21/16* (2013.01); *C10G 21/20* (2013.01); *C10G 51/02* (2013.01); *C10G 53/06* (2013.01); *C10G 55/02* (2013.01); *C10G 67/0409* (2013.01); *G01N 7/06* (2013.01); *C10G 2300/1044* (2013.01); *C10G 2300/1059* (2013.01); *C10G 2300/1096* (2013.01); *C10G 2300/202* (2013.01); *C10G 2300/206* (2013.01)

(58) Field of Classification Search
    CPC ........ C10G 55/02; C10G 55/04; C10G 55/06; C10G 57/00; C10G 67/02; C10G 67/04; C10G 67/0409; C10G 67/0445; C10G 67/049
    See application file for complete search history.

(56) References Cited

U.S. PATENT DOCUMENTS

| | | | |
|---|---|---|---|
| 6,248,797 | B1 | 6/2001 | Dias et al. |
| 6,454,932 | B1* | 9/2002 | Baldassari .............. C10G 65/10 208/153 |
| 6,726,832 | B1* | 4/2004 | Baldassari .............. C10G 65/10 208/153 |
| 8,574,426 | B2 | 11/2013 | Mezza et al. |
| 8,961,780 | B1 | 2/2015 | Yusuf et al. |
| 9,169,446 | B2 | 10/2015 | Yusuf et al. |
| 2007/0007178 | A1* | 1/2007 | Nakashima ............ C10G 75/04 208/255 |
| 2008/0093260 | A1 | 4/2008 | Koseoglu |
| 2008/0149534 | A1* | 6/2008 | Gauthier .............. C10G 21/003 208/309 |
| 2012/0074040 | A1 | 3/2012 | Koseoglu et al. |
| 2015/0184085 | A1* | 7/2015 | Yusuf .................... C10G 33/08 208/188 |
| 2015/0353847 | A1* | 12/2015 | Yusuf .................... C10G 21/16 208/208 R |
| 2016/0304793 | A1* | 10/2016 | Merdrignac ........... C10G 55/06 |

FOREIGN PATENT DOCUMENTS

| | | |
|---|---|---|
| WO | 2008154576 A1 | 12/2008 |
| WO | 2011081651 A1 | 7/2011 |
| WO | 2011106891 A1 | 9/2011 |
| WO | 2011145086 A2 | 11/2011 |
| WO | 2013089866 A1 | 6/2013 |

* cited by examiner

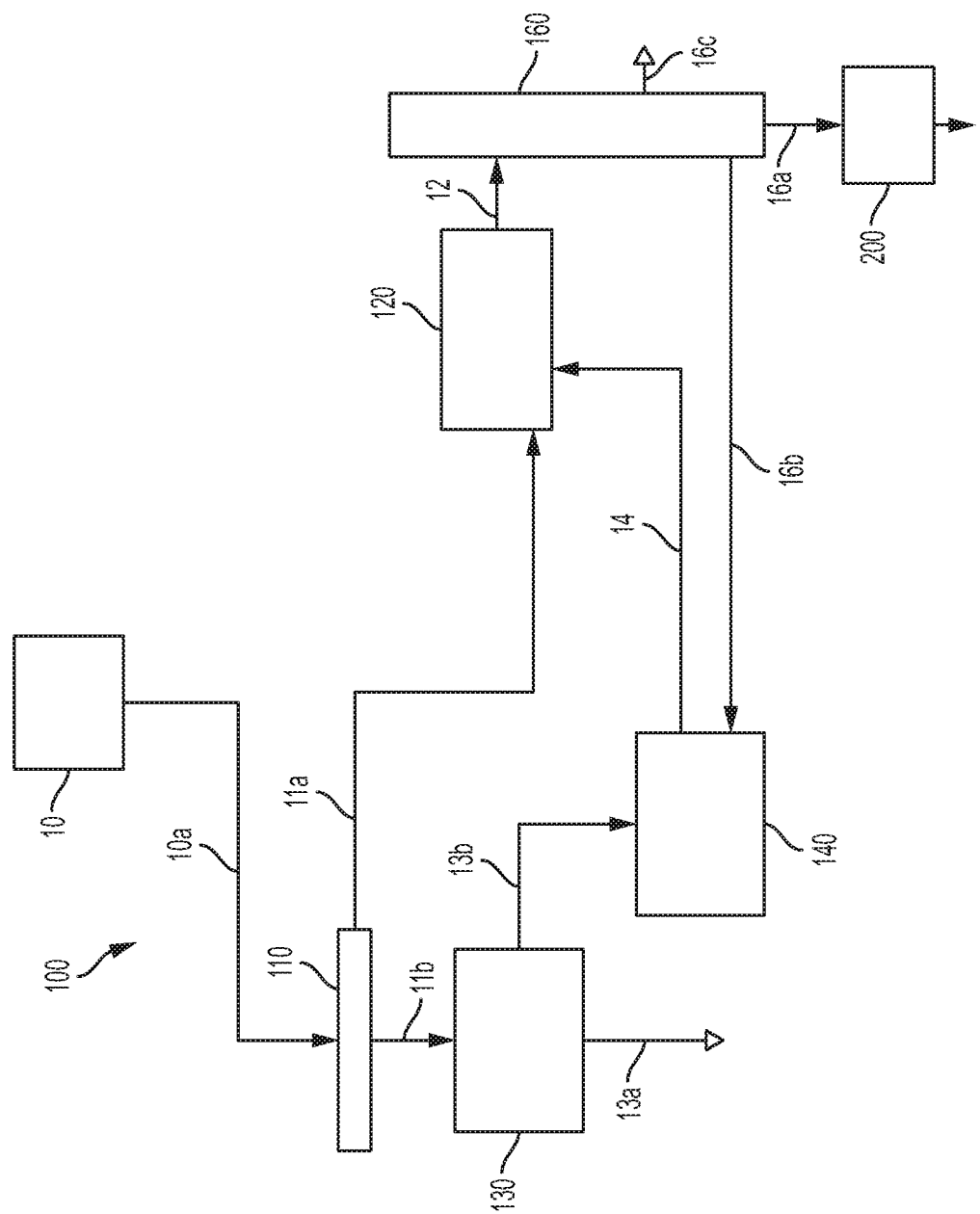

SYSTEMS AND METHODS FOR SEPARATION AND EXTRACTION OF HETEROCYCLIC COMPOUNDS AND POLYNUCLEAR AROMATIC HYDROCARBONS FROM A HYDROCARBON FEEDSTOCK

CROSS REFERENCE TO RELATED APPLICATION

This application claims the benefit of U.S. Provisional Application Ser. No. 62/442,003 filed Jan. 4, 2017.

BACKGROUND

Field

The present specification generally relates to hydrocarbon processing and, more specifically, to systems and methods for separating, extracting, and recovering heterocyclic compounds, organometallic compounds, and polynuclear aromatic hydrocarbons from a hydrocarbon feedstock.

Technical Background

Crude oil or petroleum refineries are integrations of complex processes in which crude oil and its fractions are processed by various unit operations and unit processes. A conventional refinery primarily produces transportation fuels such as liquefied petroleum gas (LPG), diesel, gasoline, aviation fuel, kerosene, and fuel oils, for example. Some refineries may also produce bitumen, asphaltenes, and aromatics. Still other petroleum refineries produce lube oils, anode grade coke, and benzene, toluene, xylene (BTX) products, depending on the type of crude oil they are processing. New generation refineries also produce olefins as petrochemical feedstock in addition to BTX products.

Refiners are processing heavier crude (that is, crude having decreased American Petroleum Institute (API) gravity values) as the supply of light crude dwindles. For example, to improve the yield of transportation fuel, which are light and mid-distillates, the refiners are cracking the greater boiling point resin fractions of heavy and medium crude. Moreover, heavy distillates (cracked or vacuum) and deasphalted oil (DAO) contain very high quantities of heterocyclics and polynuclear aromatic hydrocarbons (PAHs). As a result, significant quantities of heterocyclics and PAHs end up in the cracked heavy and mid distillates, whereas lesser molecular weight aromatics and heterocyclics end up in light cracked distillates.

The increased presence of heterocyclic compounds and PAHs in the crude supply is placing increasingly stronger constraints on hydrotreatment of the cracked distillates coming from the heavy fractions. For example, Arab Heavy contains 2.78 wt. % sulfur in its virgin crude, whereas Arab Medium contains 1.4 wt. % sulfur in its crude (on an elemental S basis). On average, a minimum of 5-10 wt. % (as organic S compounds) of the hydrocarbon is chemically bound with sulfur (S) and nitrogen (N) heterocyclics in heavy and medium crude oil. This is in addition to PAHs, resins, and asphaltenes. Moreover, owing to greater boiling point of resins and asphaltenes, the heterocyclic compounds, organometallic compounds and PAHs end up in the heavy fractions after the fractionation in an Atmospheric and Vacuum distillation column. Because the PAHs, organometallic compounds, and heterocyclic compounds are chemically bound in the larger macromolecules, such as resins and asphaltenes, the direct recovery or extraction of these larger macromolecules is not convenient or profitable and, thus, is not commercially attractive.

To obtain increased quantities of mid-distillate, the heavier fractions (atmospheric bottoms and vacuum residue) of crude are cracked depending on the refinery configuration and type of crude. As a result, the heterocyclics and PAHs extracted from resins and asphaltenes end up as smaller fragmented molecules after the cracking. A significant number of heterocyclic and PAH fractions (10 wt. % or more, as organic compound basis) remain in the mid-distillates, heavy distillates and, to some extent, the light distillate after this cracking. Therefore, concentrations of the organic heterocyclic compounds, organometallic compounds, and 2-5 cycle PAH compounds are significantly increased in mid and heavy distillate fractions. The light and mid distillates from the refining operation are transferred for hydrotreatment (HDT) to remove the compounds to produce transportation fuels (gasoline and diesel) that have decreased amounts of sulfur, nitrogen, and metals. But during the conventional hydrotreatment (HDT) of crude fractions, for example, especially mid-distillate (diesel pool) and light distillate (gasoline pool), the heterocyclic compounds are converted to hydrocarbon molecules, free from sulfur and nitrogen, whereas the PAHs are converted to at least one of aromatics and saturated cyclics.

Notwithstanding their troublesome nature when left in petroleum products, such as transportation fuels, for example, the PAHs and organic heteroatom compounds possess exotic properties. In particular, they are optically active, electrically active, chemically active, and have interesting semiconducting properties and radio-frequency properties. They also have high value in several technical markets. The same compounds lose their exotic properties during conventional hydrotreatment processes in refineries due to the saturation of their conjugated bonds.

Polynuclear aromatic hydrocarbons, refractory heterocyclic organic compounds containing at least one of sulfur and nitrogen, and organometallic compounds are valuable chemical feedstocks for many applications. Such compounds find uses in production of fine chemicals or as building blocks for organic solar cells, organic LEDs, other organic thin-film transistors, and ultra-high performance batteries, for example. Various derivatives of such compounds are also finding their places in research environments for industries such as consumer electronics and renewable energy. Though most or all of these compounds are found naturally in hydrocarbon feedstocks such as crude oil, crude fractions, and petroleum sources, for example, conventional methods of petroleum production or refining typically either cause the compounds to go to waste, to be left as minor impurities in other products without capitalizing on the additional value of the compounds in isolation, or to be removed from the petroleum source but chemically converted to sulfur, nitrogen and metal-free organic hydrocarbon during the removal.

As the overall crude oil supply around the world is diminishing, the existing crude oil supply is becoming heavier all across the globe. The presence of PAHs, refractory heterocyclic organic compounds, and organometallic compounds is much greater in heavy crude oil than in lighter crude oil. In turn, conventional hydrodesulfurization/hydrodenitrogenation (HDS/HDN) processes or demetallization processes typically used to remove such compounds from crude petroleum are being strained, especially in terms of increased cost. The cost of HDS/HDN rises with respect to the amount of the compounds in the crude oil, because HDS/HDN or demetallization requires greater severity and greater hydrogen consumption to remove greater amounts of the compounds.

On the other hand, if PAHs, refractory heterocyclic organic compounds, and organometallic compounds can be removed from crude oil or crude fractions at decreased severity and without destroying their molecular structures, two benefits can be realized. First, the compounds may be provided for further applications. Second, the total cost of HDN/HDS to eliminate nitrogen and sulfur from the crude fractions can be drastically reduced. Accordingly, ongoing needs exist for systems and methods that isolate and extract PAHs, refractory heterocyclic organic compounds containing at least one of sulfur and nitrogen, and organometallic compounds from heavy to medium crude oil or crude fractions, particularly crude oil or fractions with high asphaltene concentrations, without destroying the molecular structures thereof so that the compounds may be used or kept available for other applications.

SUMMARY

According to various embodiments, a method of extracting 1-4 cycle heterocyclic compounds and 2-5 cycle polynuclear aromatic hydrocarbons from a hydrocarbon feedstock is disclosed. The method includes providing a hydrocarbon feedstock containing crude oil fractions comprising 1-4 cycle heterocyclic compounds and 2-5 cycle polynuclear aromatic hydrocarbons, determining an asphaltene-to-resin mass ratio (A/R) ratio and an asphaltene concentration of the hydrocarbon feedstock, and treating the hydrocarbon feedstock based upon the determination of the A/R ratio and asphaltene concentration to form a treatable hydrocarbon feedstock comprising fractions with a boiling point range of greater than 360° C. The method further includes cracking the treatable hydrocarbon feedstock in a cracker to form a treated hydrocarbon feedstock comprising fractions having a boiling point range of 165° C. to 470° C., and fractionating the treated hydrocarbon feedstock into a first fractionated stream having a boiling point range of less than 165° C., a second fractionated stream having a boiling point range of 165° C. to 470° C., and a third fractionated stream having a boiling point range of greater than 470° C. Subsequently, at least one targeted portion of the 1-4 cycle heterocyclic compounds is extracted from the second fractionated stream with an aqueous solvent comprising an ionic liquid formed from pressurized carbon dioxide and water, and is transferred to a PAH extractor a 1-4 cycle heterocyclic compound-lean stream containing the 2-5 cycle polynuclear aromatic hydrocarbons after all targeted portions of the 1-4 cycle heterocyclic compounds have been extracted from the second fractionated stream. Finally, the 2-5 cycle polynuclear aromatic hydrocarbons is extracted from the heteroatom-lean stream in the PAH extractor with a solvent system comprising an aprotic solvent.

According to other embodiments, a method of extracting 1-4 cycle heterocyclic compounds and 2-5 cycle polynuclear aromatic hydrocarbons from a hydrocarbon feedstock is disclosed. The method includes providing a hydrocarbon feedstock comprising having an A/R ratio from 0:1 to 1.5:1 and an asphaltene concentration from 0 to 15% by weight (wt. %). The hydrocarbon feedstock containing crude oil fractions comprising 1-4 cycle heterocyclic compounds and 2-5 cycle polynuclear aromatic hydrocarbons. The method further includes cracking hydrocarbon feedstock in a cracker to form a treated hydrocarbon feedstock comprising fractions having a boiling point range of 165° C. to 470° C., and fractionating the treated hydrocarbon feedstock into a first fractionated stream having a boiling point range of less than 165° C., a second fractionated stream having a boiling point range of 165° C. to 470° C., and a third fractionated stream having a boiling point range of greater than 470° C. At least one targeted portion of the 1-4 cycle heterocyclic compounds is extracted from the second fractionated stream with an aqueous solvent comprising an ionic liquid formed from pressurized carbon dioxide and water. A 1-4 cycle heterocyclic compound-lean stream containing the 2-5 cycle polynuclear aromatic hydrocarbons is transferred to a PAH extractor after all targeted portions of the 1-4 cycle heterocyclic compounds have been extracted from the second fractionated stream; and subsequently the 2-5 cycle polynuclear aromatic hydrocarbons are extracted from the heteroatom-lean stream in the PAH extractor with a solvent system comprising an aprotic solvent.

Additional features and advantages of the embodiments described in this disclosure will be set forth in the detailed description which follows, and in part will be readily apparent to those skilled in the art from that description or recognized by practicing the embodiments described in this disclosure, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described in this disclosure, and together with the description serve to explain the principles and operations of the claimed subject matter.

BRIEF DESCRIPTION OF THE DRAWINGS

FIG. 1A is a schematic diagram of a treatment system that may be used in embodiments of methods for isolating and extracting organic heteroatom compounds and polynuclear aromatic hydrocarbons from a hydrocarbon feedstock described in embodiments;

DETAILED DESCRIPTION

Figure 1B:
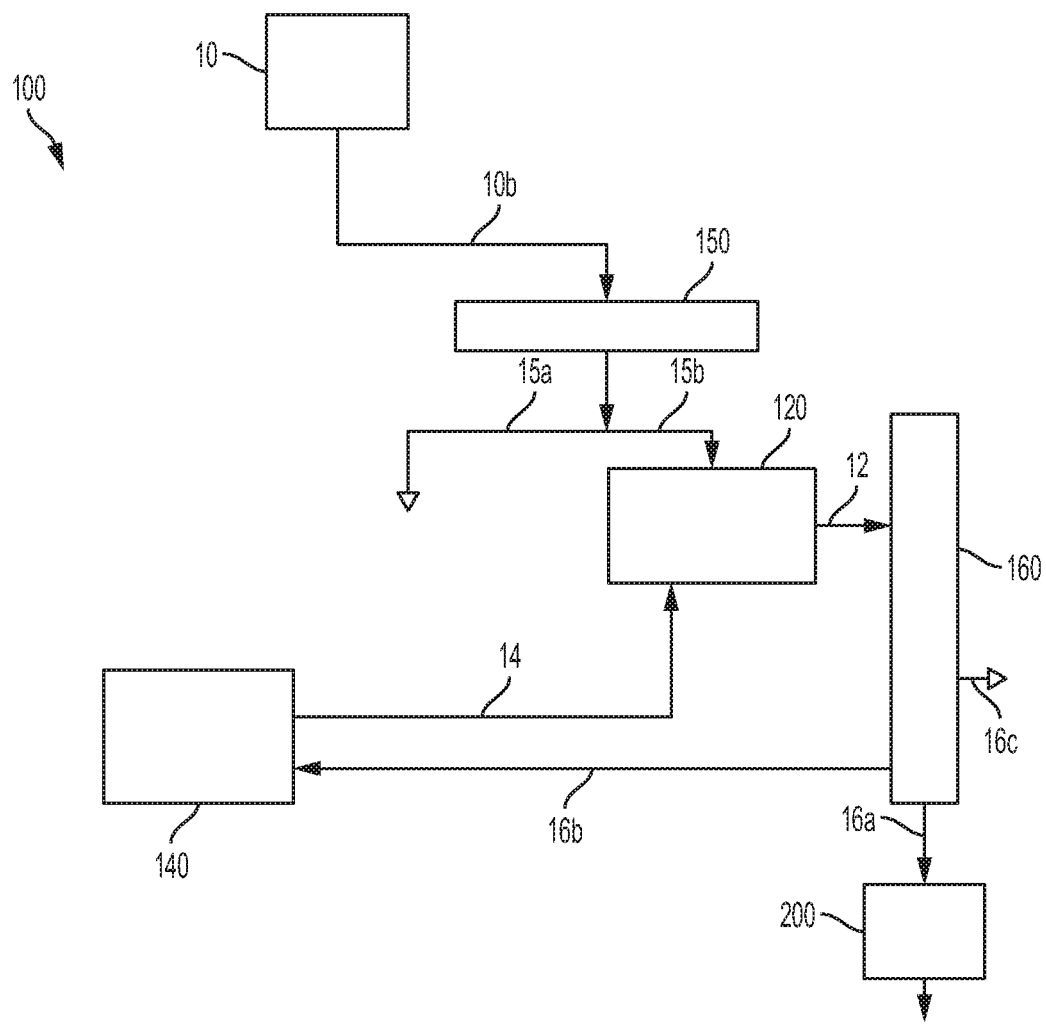
FIG. 1B is a schematic diagram of a treatment system that may be used in embodiments of methods for isolating and extracting organic heteroatom compounds and polynuclear aromatic hydrocarbons from a hydrocarbon feedstock described in embodiments.

Embodiments of methods for separating and extracting organic heteroatom compounds and polynuclear aromatic hydrocarbons from a hydrocarbon feedstock containing the organic heteroatom compounds and the polynuclear aromatic hydrocarbons will be described. The methods of separating and extracting organic heteroatom compounds and polynuclear aromatic hydrocarbons from a hydrocarbon feedstock may include treating crude oil or fractions having high asphaltene concentration prior removing the heteroatom compounds from the hydrocarbon feedstock by extraction, followed by removing the polynuclear aromatic hydrocarbons in a solvent system.

As used in this disclosure, the term "polynuclear aromatic hydrocarbon" or "PAH" refers to a hydrocarbon compound having multiple aromatic rings, in which at least two of the multiple aromatic rings are fused, that is, the multiple aromatic rings share at least one side such that at least two carbon atoms are common to two aromatic rings. Polynuclear aromatic hydrocarbons are a subset of "polycyclic aromatic hydrocarbons," which are also hydrocarbons having multiple aromatic rings, but in which fusion of aromatic rings is not necessarily present. Naphthalene is the simplest example of a polynuclear aromatic hydrocarbon. In naphthalene, two carbon atoms are shared between two fused benzene rings. In contrast, biphenyl is a polycyclic aromatic hydrocarbon because it has two aromatic rings, but biphenyl is not a polynuclear aromatic hydrocarbon because the two aromatic rings are not fused. In general, polynuclear aromatic hydrocarbons described in embodiments are molecules formed strictly of carbon and hydrogen, which do not contain any heteroatoms (that is, atoms other than carbon or hydrogen), and which do not carry substituents on any carbon atoms of the aromatic rings.

As used in this disclosure, the term "x-y cycle PAH," in which x and y are integers, refers to a polynuclear aromatic hydrocarbon, as defined previously, having from x to y aromatic rings, inclusive of x and y, at least two of which aromatic rings are fused to each other. For example, the term "2-5 cycle PAH" describes a polynuclear aromatic hydrocarbon, as defined previously, having exactly 2 aromatic rings, exactly 3 aromatic rings, exactly 4 aromatic rings, or exactly 5 aromatic rings, at least two of which aromatic rings are fused to each other.

As used in this disclosure interchangeably, the terms "heterocyclic compound" and "organic heterocyclic compound" refer to a cyclic organic compound having at least one ring that contains at least one carbon atom and at least one atom of an element other than carbon, such as sulfur, nitrogen, or oxygen, for example. Heterocyclic compounds may consist of a single ring containing at least one carbon atom and at least one atom of an element other than carbon or may comprise multiple rings, of which some or all of the multiple rings contain at least one carbon atom and at least one atom of an element other than carbon. The "x-y cycle" nomenclature used previously to describe PAH may similarly be used to describe number of rings in heterocyclic compounds disclosed and described in embodiments. In embodiments, heterocyclic compounds include from 1 to 4 rings or from 2 to 4 rings, at least one of which includes nitrogen, sulfur, or both. In embodiments, heterocyclic compounds include 3 or more rings, such as 3 or 4 rings, at least one of which includes nitrogen, sulfur, or both.

As used in this disclosure, the term "organometallic compound" refers to an organic compound containing at least one metal atom. The at least one metal atom may be bonded directly to a carbon atom or may be a metal center of a coordination compound between the at least one metal atom and at least one organic ligand.

As used in this disclosure interchangeably, the terms "heteroatom compound," "organic heteroatom compound," and "HC" refer collectively to heterocyclic compounds and organometallic compounds, as defined previously. Non-limiting examples of heteroatom compounds include organosulfur compounds such as sulfur-containing heterocyclic compounds, organonitrogen compounds such as nitrogen-containing heterocyclic compounds, and organometallic compounds such as porphyrins. In embodiments, heteroatom compounds may be natural impurities found in a hydrocarbon feedstock such as crude oil or a crude oil fraction, for example.

As used in this disclosure interchangeably "asphaltene" and "petroleum asphaltene" refer to black or brown polar hydrocarbon compounds formed by macromolecules with multiple condensed aromatic rings and a high concentration of heteroatoms (such as, for example, sulfur, nitrogen, and oxygen), and organic metals.

As mentioned previously, crude oils have a wide array of API gravity. The low-cost heavy crude (low API gravity) has greater levels of asphaltenes and resins than more costly light crude (high API gravity). As used herein, the terms "heavy crude," "medium crude," "light crude," or similar terms refer to these terms as commonly classified in the art by their API gravity. Thus, crude oils, and particularly heavy crude oils, are complex mixtures of many hydrocarbons that undergo a wide array of reactions resulting in permanent molecular and structural changes as they are exposed to various thermal conditions. The extent of these molecular and structural changes depends on the complexity of the molecular structure and the reaction environment. To reduce the effect of this complexity, when cracking or otherwise processing the crude oil, it may be useful to segregate the crude oil into different classes based on their constituents, such as their saturate, aromatic, resin, and asphaltene (SARA) fractions. The segregated crude oils may then be selectively processed based on the classification to consistently obtain a wide variety of products. However, the different SARA classifications have different cracking and hydrocracking behaviors that can require different treatments. Particularly difficult SARA fractions to process are those fractions containing high concentrations of asphaltenes.

The building blocks of asphaltenes include very condensed PAHs, non-condensed cyclic polyaromatic molecules comprising long aliphatic side or mid chains with alicyclic substituents, high quantities of heteroatoms (such as, for example, sulfur, nitrogen, and oxygen), and trace amounts of metals (such as, for example, nickel, iron, copper, and vanadium). Asphaltenes are difficult to process because they have a high boiling point, high molecular weights, and are insoluble in alkane solvents. Problems caused by the presence of asphaltenes during the upgrading of heavy oils are coke formation, fouling, rapid catalyst deactivation, and a reduced reaction rate. These problems indicate that it is desirable to treat crude oil to remove or isolate asphaltenes during crude oil upgrading. In embodiments, crude oils with high asphaltene concentrations are processed differently than crude oils with decreased asphaltene concentrations to limit the negative effects of the high molecular weight components present in asphaltenes while maintaining the commercially valuable heteroatom and PAH compounds.

The upgrading technologies for residues, such as, for example, those comprising asphaltenes, can be classified into two main categories: the hydrogen addition process; and the carbon rejection process. The hydrogen addition process generally utilizes catalysts and hydrogen from an external source, which results in an increase in the hydrogen to carbon (H/C) ratio of the product. The carbon rejection process generally utilizes thermal treatment that redistributes the hydrogen among the various products, which increases the H/C ratio in some products but reduces the H/C ratio in other products. The carbon rejection process is more generally used for residues having high asphaltene concentrations because the asphaltene rapidly deactivates the catalyst used in the hydrogen addition process. In particular, it is believed that the nickel and vanadium present in asphaltenes contribute to catalyst poisoning during catalytic cracking and can cause gas and coke formation, which reduces the production of petroleum grade liquid hydrocarbons.

Accordingly, to crack heavy and medium crude having high asphaltene concentrations, it is desirable to use deasphalted oils during the thermal cracking to avoid coke formation. In embodiments, deasphalting is carried out after fractionating the crude oil. Once fractionated, the asphaltene-containing residual feedstock may be treated by methods generally used in refineries to process residues, such as hydrocracking, fluid catalytic cracking (FCC), and high severity catalytic cracking (HSFCC). In embodiments, FCC is used to process asphaltene-containing residual feedstocks because the FCC process efficiently converts high boiling point residues. However, the effectiveness of the FCC process is dependent on the metal content and the Conradson Carbon Resid (CCR) of the feedstock. For instance, the FCC process is less effective for hydrocarbon feedstocks having high metal content and high CCR levels. Therefore, to operate FCC, the metal content and CCR are generally balanced by fractioning or pretreatment to maximize product yield and minimize catalyst deactivation. Similarly, in embodiments, the high asphaltene-content crude oil is processed according its API gravity and SARA fractions.

The methods disclosed in embodiments maximize the output of petrochemical and fine chemical feedstock while minimizing fuel oil production. To achieve this, embodiments employ different processes for hydrocarbon feedstocks comprising crude oil fractions with greater asphaltene concentration because the metals in the asphaltene quickly deactivate catalysts, and the greater-molecular weight macromolecules accelerate coke production. Thus, in embodiments, the asphaltene fractions are removed before other processing steps (that is, deasphalting is the first process step). In embodiments, the asphaltene is removed immediately after vacuum fractionating the hydrocarbon feedstock. Removing the asphaltene before conducting treatments that require a catalyst minimizes permanent catalyst deactivation and coke formation when the residual fractions are further processed.

In embodiments, after the hydrocarbon feedstock comprising heavy or medium crude is fractionated and deasphalted, the resulting residual crude contains saturates, aromatics, and resins. The residual crude is subjected to thermal, steam, or catalytic cracking to generate petrochemical intermediates, feedstocks for chemicals, and fine chemicals. The cracking process fragments the larger macromolecules, which are present as saturates, aromatics, organometallics, and resins. The cracking is most effective for saturates and least effective for resins, particularly larger resin macromolecules, such as, for example, heterocycles.

After cracking the deasphalted stream comprising crude oil fractions, the cracked product is subjected to fractionation, which results in a wide array of products. For instance, the lighter components of the crude oil are separated into different fractions as petroleum feedstock or refinery feedstock. The mid-weight fractions, which have a boiling point range from about 165° C. to about 470° C., are subjected to solvent extraction, which is described in more detail. The heaviest fractions, which have a boiling point range greater than about 470° C., are transferred to a mild hydrocracker, and subsequently are processed by thermal, steam, or catalytic cracking to crack high molecular weight macromolecules to form an increased amount of separable PAHs, heterocyclic and organometallic compounds. Previously, it was not possible to efficiently extract useable compounds, such as, for example, 2-5 cycle PAHs and 1-4 cycle heterocyclic compounds, from hydrocarbon feedstocks comprising heavy crude oil with high concentrations of asphaltenes. However, embodiments comprise additional processing of the heaviest fraction that increases the amount of desirable compounds available for extraction, such as, for example, 4 cycle heterocyclic compounds and 5 cycle PAHs. These molecules are of commercial interest and are relatively easy to extract compared to higher cycle heterocyclic compounds and PAHs.

Specific embodiments of methods are now disclosed with reference to FIGS. 1A-1D. Depending on the classification of the crude oil feedstock, different process steps will be followed. It should be understood that the extraction systems 100 of FIGS. 1A-1D are meant to be illustrative of non-limiting embodiments of systems that may be used in the methods. It should be further understood that the extraction system 100 of FIGS. 1A-1D may be altered in numerous ways yet still remain capable of performing the methods described in this disclosure.

In the embodiments of FIGS. 1A-1D, the feedstock 10 may be crude oil from any source, such as, for example, from a subterranean deposit, product of a refining process, or crude oil shipped from any other source. Additionally, it should be understood that fractions and other streams depicted in the figures and described in this disclosure may be transferred from unit to unit by any suitable conduit, such as, for example, piping, hosing, or the like. The fractions and other streams may be moved through the conduit by any means, such as, for example, pumps, vacuums, and pressure differentials.

With reference to FIG. 1A, in embodiments where the hydrocarbon feedstock 10 comprises medium to heavy crude with an A/R ratio of from 0.5:1 to 1.5:1 and an asphaltene concentration from 2.0 wt. % to 15 wt. %, this feedstock 10a is first fed into a vacuum fractionator 110 where it is separated into a lighter fraction stream 11a having components with a boiling point range of about 360 degrees Celsius (° C.) to about 470° C. and a heavier fraction stream 11b having components with a boiling point range greater than about 470° C. The lighter fraction stream 11a is transferred to a thermal, steam, or catalytic cracker 120 and the heavier fraction stream 11b is transferred to a solvent deasphalter 130. At the solvent deasphalter 130 an asphalt fraction 13a and deasphalted oil stream 13b are separated from the heavier fraction stream 11b. The asphalt fraction 13a is then discarded from the extraction system 100 for other uses and the deasphalted oil stream 13b is transferred to a mild hydrocracker 140. At the mild hydrocracker 140, the greater molecular weight macromolecules in the deasphalted oil steam are cracked to form molecules with decreased molecular weights and separable heterocyclic, PAHs, and organometallic components. The mildly hydrocracked oil stream 14 is then transferred to the thermal, steam, or catalytic cracker 120.

Fractions 12 exiting the thermal, steam, or catalytic cracker 120 are transferred to fractionator 160. At fractionator 160, the incoming fractions 12 are further separated into fractions ranging from $H_2$ to greater molecular weight fractions having components with a boiling point range greater than 470° C. Fraction 16a generated at fractionator 160 having components with a boiling point range of about 165° C. to about 470° C. is selected for solvent extraction and transferred to extraction system 200, as described in more detail subsequently. Fraction 16b generated at fractionator 160 having components with a boiling point range of greater than about 470° C. is transferred to the mild hydrocracker 140 and returned to the thermal, steam, or catalytic cracker 120 after mild hydrocracking. Fraction 16c having a boiling point range of less than about 165° C. is separated into different fractions, such as $H_2$, Py gas, BTX, and chemical and petrochemical feedstocks for steam cracking.

With reference to FIG. 1B, in embodiments where the hydrocarbon feedstock 10 comprises medium to heavy crude having an A/R ratio from 0.5:1 to 1.5:1 and an asphaltene concentration from 2 wt. % to 15 wt. %, this hydrocarbon feedstock 10b is transferred to fractionator 150. It should be noted that the composition of the stream sent to fractionator 150 in FIG. 1B is different than the composition of the feedstock sent to vacuum fractionator 110 in FIG. 1A. At the fractionator 150, the hydrocarbon feedstock 10b is fractionated into a lighter fraction stream 15a having components with a boiling point range less than about 360° C. and a heavier fraction stream 15b having components with a boiling point range greater than about 360° C. The lighter fraction stream 15a is discarded from the extraction system 100 and, for example, may be transferred to a refinery to be used as a petrochemical feedstock. The heavier fraction stream 15b is transferred to the thermal, steam, or catalytic cracker 120.

Fractions 12 exiting the thermal, steam, or catalytic cracker 120 are transferred to fractionator 160. At fractionator 160, the incoming fractions 12 are further separated into fractions ranging from $H_2$ to greater molecular weight fractions having components with a boiling point range greater than 470° C. Fraction 16a generated at fractionator 160 having components with a boiling point range of about 165° C. to about 470° C. is selected for solvent extraction and transferred to extraction system 200, described in more detail subsequently. Fraction 16b generated at fractionator 160 having components with a boiling point range of greater than about 470° C. is transferred to the mild hydrocracker 140 and returned to the thermal, steam, or catalytic cracker 120 after mild hydrocracking. Fraction 16c having a boiling point range of less than about 165° C. is separated into different fractions, such as $H_2$, Py gas, BTX, and chemical and petrochemical feedstocks, for steam cracking.

In embodiments (not depicted) where the hydrocarbon feedstock is medium to heavy crude with the attributes described for hydrocarbon feedstock 10b, the feedstock having a low A/R ratio and low asphaltene concentration is transferred directly to a thermal, steam, or catalytic cracker without being fractionated.

Figure 1C:
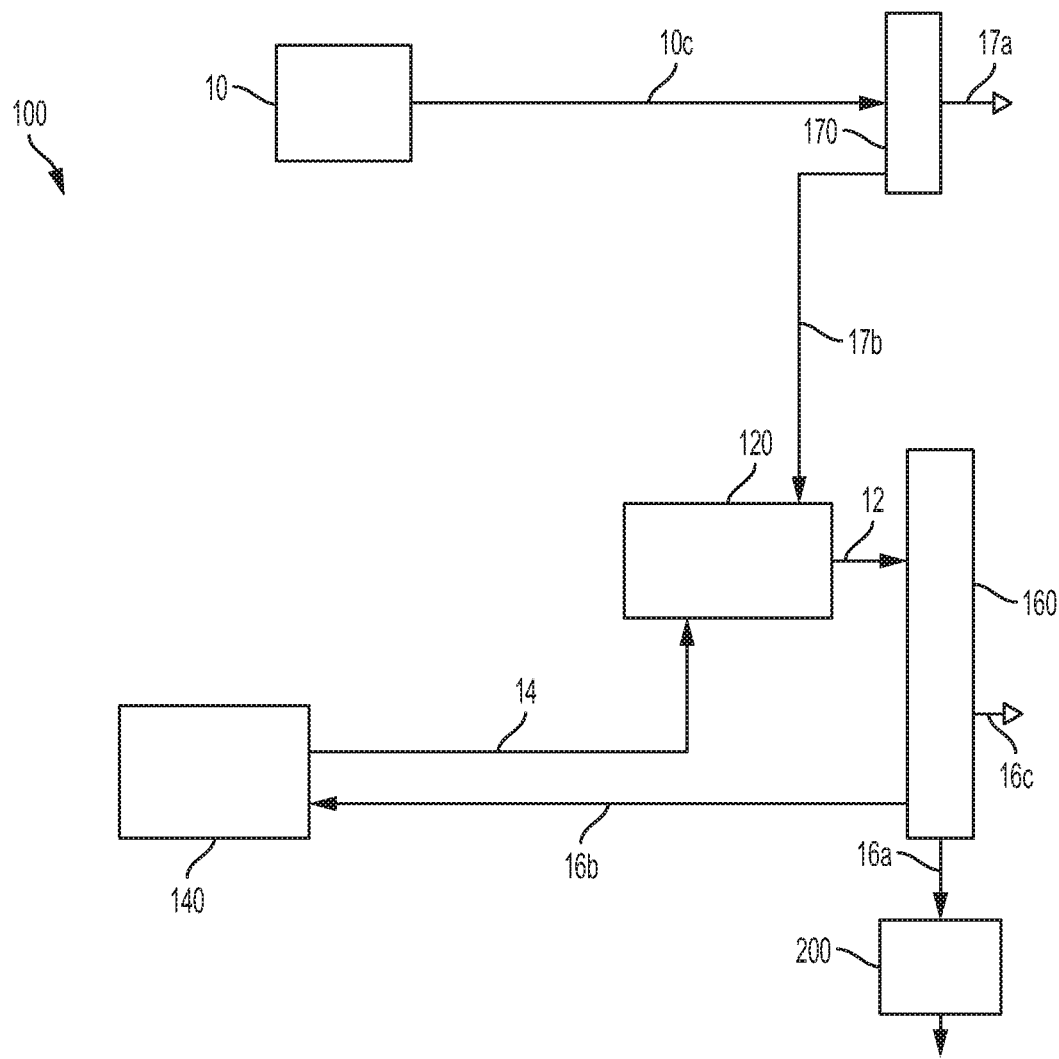
FIG. 1C is a schematic diagram of a treatment system that may be used in embodiments of methods for isolating and extracting organic heteroatom compounds and polynuclear aromatic hydrocarbons from a hydrocarbon feedstock described in embodiments.

With reference to FIG. 1C, in embodiments where the hydrocarbon feedstock 10 comprises light crude having an A/R ratio from 0:1 to 0.5:1 and an asphaltene concentration from 0.0 wt. % to 2.0 wt. %, this hydrocarbon feedstock 10c is transferred to fractionator 170. At fractionator 170 the hydrocarbon feedstock 10c is separated into a lighter fraction stream 17a and a heavy fraction stream 17b. The light fraction stream 17a, which has components with a boiling point range less than about 360° C. are separated into $C_1$ to $C_5$ hydrocarbons, BTX, and petrochemical and refinery feed stocks. The separated light fraction stream 17a is discarded from the extraction system 100 and, for example, may be sent to refineries or chemical plants for further processing. The heavy fraction stream 17b is transferred from fractionator 170 to the thermal, steam, or catalytic cracker 120.

Fractions 12 exiting the thermal, steam, or catalytic cracker 120 are transferred to fractionator 160. At fractionator 160, the incoming fractions 12 are further separated into fractions ranging from $H_2$ to greater molecular weight fractions having components with a boiling point range greater than 470° C. Fraction 16a generated at fractionator 160 having components with a boiling point range of about 165° C. to about 470° C. is selected for solvent extraction and transferred to extraction system 200, described in more detail subsequently. Fraction 16b generated at fractionator 160 having components with a boiling point range of greater than about 470° C. is transferred to the mild hydrocracker 140 and returned to the thermal, steam, or catalytic cracker 120 after mild hydrocracking. Fraction 16c having a boiling point range of less than about 165° C. is separated into different fractions, such as $H_2$, Py gas, BTX, and chemical and petrochemical feedstocks for steam cracking.

Figure 1D:
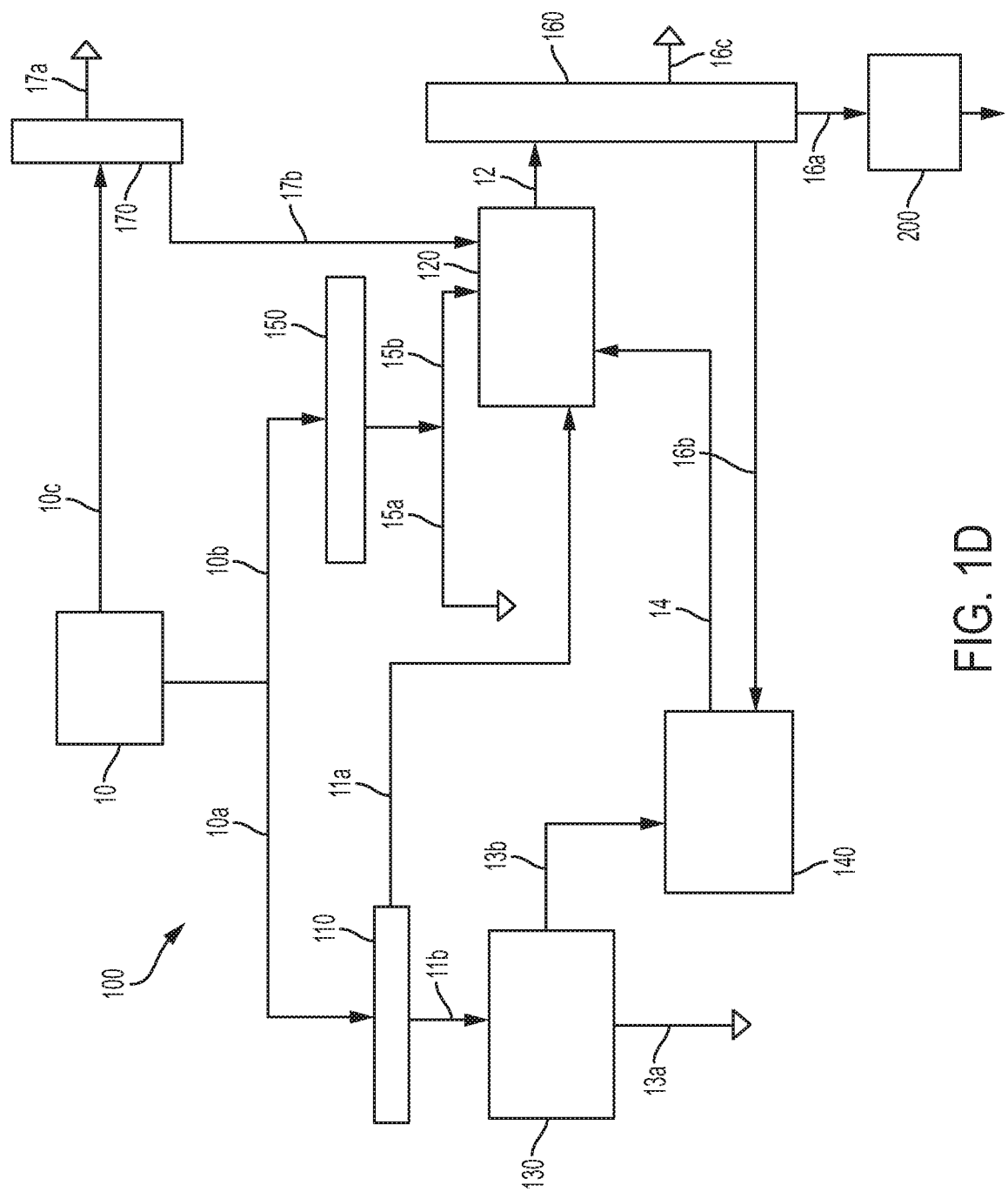
FIG. 1D is a schematic diagram of a treatment system that may be used in embodiments of methods for isolating and extracting organic heteroatom compounds and polynuclear aromatic hydrocarbons from a hydrocarbon feedstock described in embodiments.

With reference to FIG. 1D, an integrated system 100 for treating crude that may be light crude, medium crude, or heavy crude, is depicted. In particular, FIG. 1D shows an embodiment in which the treatment systems 100 described in FIGS. 1A-1C are integrated. In embodiments, the A/R ratio and asphaltene concentration of the hydrocarbon feedstock 10 is determined and then the hydrocarbon feedstock is directed to the appropriate portion of the integrated treatment system 100 as one of hydrocarbon streams 10a, 10b, or 10c.

In embodiments where the hydrocarbon feedstock 10 comprises medium to heavy crude with greater A/R ratio and greater asphaltene concentration, this greater A/R ratio and greater asphaltene feedstock 10a is first fed into a vacuum fractionator 110 where it is separated into a lighter fraction stream 11a having components with a boiling point range of about 360° C. to about 470° C. and a heavier fraction stream 11b having components with a boiling point range greater than about 470° C. The lighter fraction stream 11a is transferred to a thermal, steam, or catalytic cracker 120 and the heavier fraction stream 11b is transferred to a solvent deasphalter 130. At the solvent deasphalter 130 an asphalt fraction 13a and deasphalted oil stream 13b are separated from the heavier fraction stream 11b. The asphalt fraction 13a is then discarded from the extraction system 100 for other uses and the deasphalted oil stream 13b is transferred to a mild hydrocracker 140. At the mild hydrocracker 140, the greater molecular weight macromolecules in the deasphalted oil steam are cracked to form lesser molecular weight molecules having separable heterocyclic, PAHs, and organometallic. The mildly hydrocracked oil stream 14 is then transferred to the thermal, steam, or catalytic cracker 120.

In embodiments where the hydrocarbon feedstock 10 comprises medium to heavy crude having lesser A/R ratio and lesser asphaltene concentration, the hydrocarbon feedstock 10b having a lesser A/R ratio and lesser asphaltene concentration is transferred to fractionator 150. At the fractionator 150, the hydrocarbon feedstock 10b is fractionated into a lighter fraction stream 15a having components with a boiling point range less than about 360° C. and a heavier fraction stream 15b having components with a boiling point range greater than about 360° C. The lighter fraction stream 15a is discarded from the extraction system 100 and, for example, may be transferred to a refinery to be used as a petrochemical feedstock. The heavier fraction stream 15b is transferred to the thermal, steam, or catalytic cracker 120.

In embodiments where the hydrocarbon feedstock 10 comprises light crude having lesser A/R ratio and lesser asphaltene concentration, the lesser asphaltene concentration hydrocarbon feedstock 10c is transferred to fractionator 170. At fractionator 170 the hydrocarbon feedstock 10c is separated into a lighter fraction stream 17a and a heavy fraction stream 17b. The light fraction stream 17a, which has components with a boiling point range less than about 360° C. are separated into $C_1$ to $C_5$ hydrocarbons, BTX, and petrochemical and refinery feed stocks. The separated light fraction stream 17a is discarded from the extraction system 100 and, for example, may be sent to refineries or chemical plants for further processing. The heavy fraction stream 17b is transferred from fractionator 170 to the thermal, steam, or catalytic cracker 120.

Fractions 12 exiting the thermal, steam, or catalytic cracker 120 (which, in various embodiments include one or more fractions received from fractionator 110, fractionator 150, fractionator 170, and mild hydrocracker 140) are transferred to fractionator 160. At fractionator 160, the incoming fractions 12 are further separated into fractions ranging from $H_2$ to high molecular weight fractions having a boiling point range greater than 470° C. Fraction 16a generated at fractionator 160 having a boiling point range of about 165° C. to about 470° C. is selected for solvent extraction and transferred to extraction system 200, which is described in more detail. Fraction 16b generated at fractionator 160 having a boiling point range of greater than about 470° C. is transferred to the mild hydrocracker 140 and returned to the thermal, steam, or catalytic cracker 120 after mild hydrocracking. Fraction 16c having a boiling point range of less than about 165° C. is separated into different fractions, such as $H_2$, Py gas, BTX, and chemical and petrochemical feedstocks for steam cracking.

Components of the extraction system 100 will now be described in more detail. It should be understood that the following descriptions are provided as general descriptions of equipment used crude oil and hydrocarbon processing. Various modifications may be made to the components depending on the particular use.

At the fractionators 110, 150, 160, and 170, a feed stream 10a, 10b, 10c, or 12 are introduced into a fractionation vessel in which the feed stream 10a, 10b, 10c, or 12 undergoes a separation process. In one embodiment, the separation process is dependent on boiling point variations of various components of the feed stream 10a, 10b, 10c, or 12. For example, the separation process may include fractional distillation. The separation process separates the feed stream 10a, 10b, 10c, or 12 into multiple solute fractions. The solute fractions are further treated by suitable techniques as described in embodiments at respective units. In embodiments, the solute fractions each may contain very pure heteroatom compounds of a particular molecular structure.

At the solvent deasphalter 130 a heavy fraction 11b is contacted with a solvent, such as, for example, propane, butane, and pentane, in a counter-current extractor at temperatures and pressures to precipitate the asphaltene and resin fractions that are not soluble in the solvent. In embodiments where propane is used as the solvent, the temperature in the deasphalter 130 is from 50° C. to about 100° C., such as from about 60° C. to about 90° C., or even from about 70° C. to about 80° C., and the pressure in the deasphalter 130 is from about 3.00 MPa to about 5.00 MPa, such as from about 3.50 MPa to about 4.50 MPa, or even from about 3.75 MPa to about 4.25 MPa. In embodiments where butane is used as the solvent, the temperature in the deasphalter 130 is from 90° C. to about 140° C., such as from about 100° C. to about 130° C., or even from about 110° C. to about 120° C., and the pressure in the deasphalter 130 is from about 3.50 MPa to about 7.500 MPa, such as from about 4.00 MPa to about 7.00 MPa, or even from about 4.5 MPa to about 6.5 MPa. In embodiments where pentane is used as the solvent, the temperature in the deasphalter 130 is from 160° C. to about 220° C., such as from about 170° C. to about 210° C., or even from about 180° C. to about 200° C., and the pressure in the deasphalter 130 is from about 3.50 MPa to about 5.50 MPa, such as from about 4.00 MPa to about 5.00 MPa, or even from about 4.25 MPa to about 4.75 MPa. The quality of the deasphalted oil stream 13b can be maintained or increased at a constant yield by increasing temperature and solvent-to-feed ratio. In embodiments where propane is used as the solvent, the solvent-to-feed ratio, by volume, is from about 5:1 to about 10:1, such as from about 6:1 to about 9:1, or even from about 7:1 to about 8:1. In embodiments where butane is used as the solvent, the solvent-to-feed ratio, by volume, is from about 3:1 to about 8:1, such as from about 4:1 to about 7:1, or even from about 5:1 to about 6:1. In embodiments where pentane is used as the solvent, the solvent-to-feed ratio, by volume, is from about 2:1 to about 6:1, such as from about 3:1 to about 5:1.

At the mild hydrocracker 140, feed streams 16b and 13b are combined with a hydrogen gas source (not shown). At temperatures ranging from about 330° C. to about 440° C., such as from about 340° C. to about 430° C., or even from about 350° C. to about 420° C., and pressures of from about 4 MPa to about 16 MPa, such as from about 5 MPa to about 15 MPa, or even from about 6 MPa to about 14 MPa, the hydrogen aids in breaking of carbon-carbon bonds, thereby reducing the molecular weight of components leaving the mild hydrocracker 140 compared to the molecular weight of the components entering the mild hydrocracker 140 in feed streams 16b and 13b. A liquid hourly space velocity (LHSV) of the mild hydrocracker 140 is, in embodiments, from about 0.1 $h^{-1}$ to about 1.5 $h^{-1}$, such as from about 0.5 $h^{-1}$ to about 1.0 $h^{-1}$. The hydrogen to oil ratio is a measure, at standard conditions, of the normal volume feed to the normal volume of gas. The hydrogen to oil ratio is, in embodiments, from about 250 $Nm^3/m^3$ to about 1050 $Nm^3/m^3$, such as from about 300 $Nm^3/m^3$ to about 1000 $Nm^3/m^3$, or even from about 350 $Nm^3/m^3$ to about 950 $Nm^3/m^3$. In embodiments, a catalyst may be used in the mild hydrocracker 140, such as, for example NiMo or NiW with acid supports such as zeolites or amorphous silica alumina systems.

At the thermal, steam, or catalytic cracker 120 one or more feed streams 11a, 14, 15b, and 17b are cracked to comprise lesser molecular weight components than the components entering the thermal, steam, or catalytic cracker 120 in feed streams 11a, 14, 15b, and 17b. Where the thermal, steam, or catalytic cracker 120 is a thermal cracker, high temperatures and pressures are utilized in a reaction vessel to break bonds of the greater molecular weight components. In embodiments, the temperature in the reaction vessel may be from about 400° C. to about 480° C. and the pressure may be from about 1 bar to about 3 bars and is dependent on the feed stream to be cracked.

Where the thermal, steam, or catalytic cracker 120 is a steam cracker, a liquid feed stream is diluted with steam and briefly heated in a furnace without the presence of oxygen. The reaction temperature may very high, such as, for example, at temperatures from about 750° C. to about 870° C., such as from about 800° C. to about 860° C., or even from about 810° C. to about 850° C. The greater the severity, the greater the reaction temperature, and the lesser the severity, the lesser the reaction temperature. However, the reaction is only allowed to take place very briefly, such as, for example, from about 0.1 to about 0.4 seconds. After the cracking temperature has been reached, the gas is quickly quenched to stop the reaction in a transfer line heat exchanger or inside a quenching header using quench oil.

Where the thermal, steam, or catalytic cracker 120 is a catalytic cracker, acid catalysts or zeolite may be used, which promote a heterolytic (asymmetric) breakage of bonds yielding pairs of ions of opposite charges. Such catalysts comprise a carbocation and the very unstable hydride anion. In the catalytic cracker carbon-localized free radicals and cations are both quite unstable and undergo processes of chain rearrangement, carbon-carbon scission in position beta, and intra- and intermolecular hydrogen transfer.

This process can be used to reduce the molecular weight and boiling point of components in crude oils, such as reducing the asphaltene concentration of heavy and medium crude oils. The processed fractions have greater quantities of heterocyclic compounds and PAHs with a boiling point in the range of about 165° C. to about 470° C., which can be further isolated and separated using the methods described in this disclosure.

Many high commercial value compounds, including 2-5 cycle PAHs and 1-4 cycle heterocyclic compounds, have boiling points in the range of about 165° C. to about 470° C. Further, removal of 1-4 cycle heterocyclic compounds from the other compounds having boiling points in the range of about 165° C. to about 470° C. can improve the kinetics of hydrotreatment (HDT) of transportation fuel because removal of these 1-4 cycle heterocyclic compounds efficiently desulfinates the transportation fuel when compared to 1 cycle heterocyclic and non cyclic compounds containing sulfur. Thus, isolating and removing the 1-4 cycle heterocyclic compounds before HDT can streamline the HDT process and allow it to run more efficiently.

In embodiments, extraction of sulfur, nitrogen, and metal-containing heterocyclic compounds is maximized by selecting cracked fractions for extraction before the HDT process. Thus, when using the process described in this disclosure, and depicted in FIGS. 1A-1D, in conjunction with a subsequent HDT process, fractions that are rich in heterocyclic organic sulfur, nitrogen, and organometallic compounds are cracked prior to the solvent extraction.

Molecular weights in the various fractions depend on the boiling point cuts. Therefore, in embodiments, the process combines streams having boiling points from about 165° C. to about 470° C. and contain high concentrations of PAHs, heterocyclic compounds, and organometallic compounds before the extraction. Fractions with lesser concentrations of heterocyclic compounds, such as fractions with less than 2%, heterocyclic compounds, less than 1.5% heterocyclic compounds, or less than 1% heterocyclic compounds may be avoided to increase the efficiency of the extraction unit. In embodiments, fractions that do not comprise the minimum concentration of heterocyclic compounds may bypass the extraction unit and be transferred directly to HDT.

According to embodiments of the extraction methods described in this disclosure, at least a portion of the heteroatom compounds present in a hydrocarbon feedstock are removed from the hydrocarbon feedstock using a first solvent system to form a heteroatom-rich stream and a heteroatom-lean stream. When extraction and further use of the heteroatom compounds are desired, the heteroatom-rich stream may be further processed to provide outputs of individual heteroatom compounds. The heteroatom-lean stream may be treated in a second solvent system to remove mixtures of polynuclear aromatic hydrocarbons, which mixtures may be further processed to provide outputs of individual PAHs if desired. After removal of the PAHs from the heteroatom-lean stream, a hydrocarbon raffinate that is lean in both heteroatom compounds and PAHs is formed. The hydrocarbon raffinate may be subjected to desulfurization or hydrotreatment processes having substantially reduced energy costs compared to conventional processes in which the hydrocarbon feedstock would be subjected to the desulfurization or hydrotreatment processes without removal of at least one of the heteroatom compounds and the polynuclear aromatic hydrocarbons.

As mentioned previously, the methods for extracting heteroatoms may include processing a hydrocarbon feedstock containing crude oil to have fractions with a boiling point range of from about 165° C. to about 470° C. The crude oil fractions may include heteroatom compounds and PAHs. In embodiments, the crude oil fractions may include heteroatom compounds and polynuclear aromatic hydrocarbons. In embodiments, the PAHs may be, for example, 1-4 cycle PAHs, 2-4 cycle PAHs, 3-4 cycle PAHs, or 2-5 cycle PAHs.

Embodiments of methods for extracting at least a portion of the heteroatom compounds from the hydrocarbon feedstock use a tunable solvent in at least one extraction vessel of a heteroatom extraction system. The heteroatom extraction system will be described in greater detail. The extraction may form a heteroatom-compound rich stream containing heteroatom compounds and a heteroatom-compound lean stream containing the polynuclear aromatic hydrocarbons. The tunable solvent may include an ionic liquid formed from pressurized carbon dioxide and water. Subsequently, the tunable solvent will be described in greater detail. The heteroatom-compound lean stream may be transferred to another vessel, and then the polynuclear aromatic hydrocarbons may be extracted from the heteroatom-compound lean stream. The polynuclear aromatic hydrocarbons may be extracted with a solvent system that contains an aprotic solvent and, optionally, a protic solvent. Aprotic solvents may include N-methylpyrrolidone, dimethylsulfoxide, and aromatic compounds, for example. Protic solvents may include water and acetic acid, for example. Once the polynuclear aromatic hydrocarbons are removed from the heteroatom-compound lean stream, the resulting hydrocarbon raffinate has substantially lesser amounts of heteroatom compounds and polynuclear aromatic hydrocarbons than the original hydrocarbon feedstock. For this reason, the hydrocarbon raffinate formed according to embodiments will require substantially less cost and energy to treat by hydroprocessing or desulfurization.

In embodiments of methods for separating or extracting heteroatom compounds and PAHs from a hydrocarbon feedstock containing the heteroatom compounds and the polynuclear aromatic hydrocarbons, two separate solvent systems are used to capture or extract two separate classes of compounds, in particular, organic heteroatom compounds and polynuclear aromatic hydrocarbons. During a first stage of extraction, a switchable, tunable, solvent that behaves as an ionic liquid is deployed to recover sulfur heterocyclic compounds, nitrogen heterocyclic compounds, and organometallic compounds from crude and its fractions without cross contaminating the crude fractions. The crude fractions in the boiling point range of 165° C. to 470° C. may be primarily rich in sulfur and nitrogen heterocyclic compounds and organometallic compounds. The solvent of the first stage may include supercritical and subcritical carbon dioxide ($CO_2$) and water that form complexes with heterocyclic compounds and organometallic compounds. After the extraction stage, the recovered compounds are ejected from the solvent system in separate vessels at least one of a pressure and temperature variation and are immobilized in a second solvent system including aprotic solvents such as NMP, DMSO, aromatic solvents, or combinations thereof. The first solvent system ($CO_2$ and water) may be recycled for further recovery of the heterocyclic compounds. Thereby, the heterocyclic compounds can be recovered without contaminating the crude fractions.

Following the first extraction, the heteroatom-compound fractions are again subjected to extraction using an aprotic solvent-system to extract PAHs, such as 2-5 cycles PAHs or 3-5 cycle PAHs, for example. A seamless integration of this separation processes with petroleum refinery results in smooth, continuous, and profitable operation of the refinery. The sequence of the deployments of the solvents for extraction units, first the tunable solvent, then the aprotic solvent, prevents the aprotic solvents from indiscriminately extracting the heterocyclics and PAHs as a mixed product.

Figure 2:
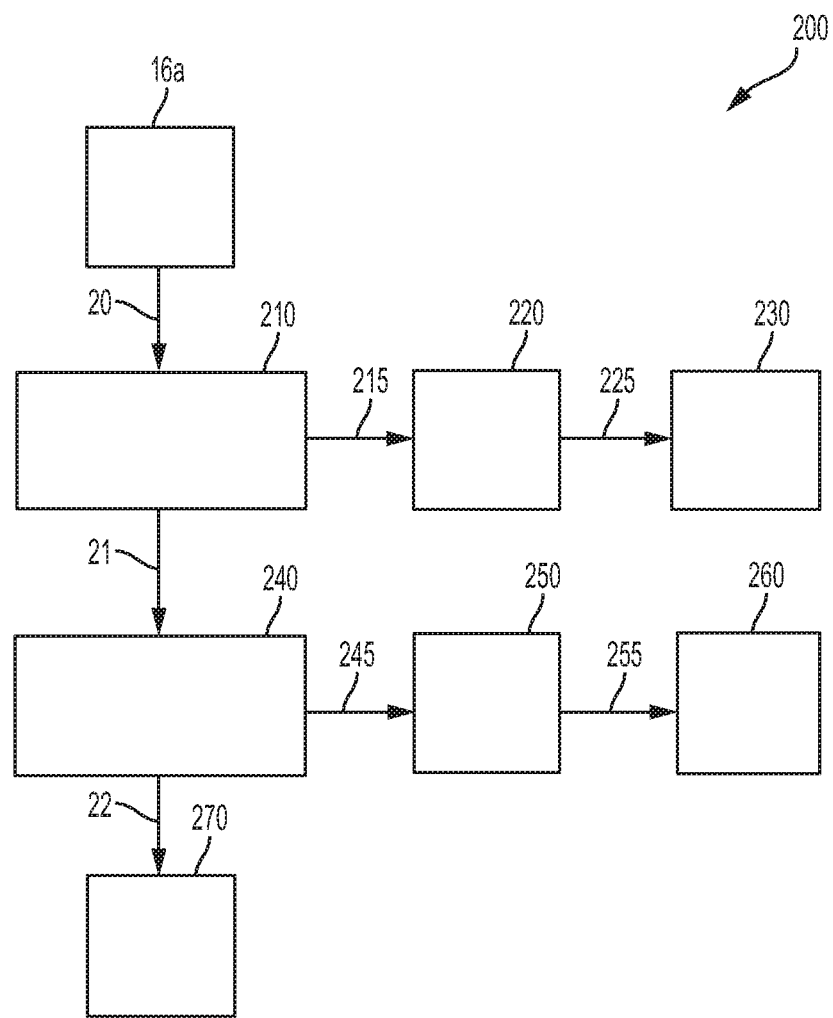
FIG. 2 is a schematic diagram of an extraction system that may be used in embodiments of methods for separating and extracting organic heteroatom compounds and polynuclear aromatic hydrocarbons from a hydrocarbon feedstock described in embodiments.

According to embodiments, methods for separating or extracting organic heteroatom compounds and PAHs from a hydrocarbon feedstock may be carried out using a system such as the extraction system 200 of FIG. 2, for example. It should be understood that the extraction system 200 of FIG. 2 is meant to be illustrative of only one non-limiting embodiment of a system that may be used in the methods described in this disclosure. It should be further understood that the extraction system 200 of FIG. 2 may be altered in numerous ways yet still remain capable of performing the methods described in this disclosure.

In the extraction system 200 according to FIG. 2, receives a hydrocarbon source 16a, which is a fraction generated from fractionator 160 (shown in FIG. 1) having boiling points from about 165° C. to about 470° C. A hydrocarbon feedstock 20 may be introduced into a heteroatom-compound extraction system 210. Included in the hydrocarbon feedstock 210 may be, for example, 2-5 cycle PAHs, 3-5 cycle PAHs, or 4-5 cycle PAHs.

The heteroatom-compound extraction system 210 separates the fractionated hydrocarbon feedstock 20 into a heteroatom-compound recovery stream 215 and a heteroatom-compound lean stream 21. Additional intermediate steps of the separation of the fractionated hydrocarbon feedstock 20 into the heteroatom-compound recovery stream 215 and a heteroatom-compound lean stream 21 will be described with reference to FIGS. 2-4. The heteroatom-compound recovery stream 215 may be transferred to a heteroatom-compound fractionator 220. The heteroatom-compound fractionator 220 separates the heteroatom-compound recovery stream 215 into multiple heteroatom-compound solute fractions 255. Each heteroatom-compound solute fraction 225 may be recovered at a heteroatom-compound recovery vessel 230 assigned to the heteroatom-compound solute fraction 225.

In embodiments, the heteroatom-compound lean stream 21 from the heteroatom-compound extraction system 210 may be transferred to a PAH extraction system 240. The PAH extraction system 240 may contain a solvent system that separates the heteroatom-compound lean stream 21 into a PAH-rich phase and a PAH-lean phase. The PAH-lean phase may be transferred as a raffinate stream 22 to a raffinate recovery vessel 270 for additional processing. The PAH-rich phase may be transferred as a PAH recovery stream 245 to a PAH fractionator 250. The PAH fractionator 250 separates the PAH recovery stream 245 into multiple PAH solute fractions 255. Each PAH solute fraction 255 may be recovered at a PAH compound recovery vessel 260 assigned to the PAH solute fraction 255. It should be understood that the schematic of FIG. 2 is intended to be cursory in nature. Individual components of the extraction system 200, such as the heteroatom-compound extraction system 210, the heteroatom-compound fractionator 220, the PAH extraction system 240, and the PAH fractionator 250, will each be described in greater detail.

In embodiments of methods for separating or extracting organic heteroatom compounds and PAHs from a hydrocarbon feedstock, the extraction system 200 of FIG. 2 includes a heteroatom-compound extraction system 210. The heteroatom-compound extraction system 210 removes at least a portion of the heteroatom compounds from the hydrocarbon feedstock through use of a reversible/switchable/tunable solvent system (referred to in this disclosure as "tunable solvent"). The tunable solvent allows the heteroatom compounds to maintain their physical and chemical properties upon separation from the hydrocarbon feedstock. In embodiments, the tunable solvent may be an ionic liquid, a gas expanded ionic liquid, or another solvent that selectively attracts the heteroatom compounds. The tunable solvent may form a reversible complex with the heteroatom compounds. In embodiments, various properties of the tunable solvent can be controlled so that the tunable solvent becomes more ionic or less ionic in nature and, thus, may be selectively attracted to or selectively form reversible complexes with one or more chosen heteroatom compounds. The switchable or tunable solvents are also known as "reversible ionic liquids" and are quite compatible with crude fractions having boiling points in the range of about 165° C. to about 470° C. The tunable solvent can act homogeneously or heterogeneously by appropriate tuning of the solvent properties such that it selectively dissolves or forms complexes with heteroatom compounds from the hydrocarbon phase.

In embodiments the tunable solvent includes a mixture of water and supercritical or subcritical liquid carbon dioxide. In embodiments, the aqueous solvent includes supercritical carbon dioxide. In embodiments, the aqueous solvent includes subcritical carbon dioxide. In embodiments, the aqueous solvent includes both supercritical and subcritical carbon dioxide. As noted previously, in embodiments the aqueous solvent may be mixed with the hydrocarbon feedstock to form an extraction mixture within an extraction vessel. Also as noted previously, in embodiments, the aqueous solvent may be mixed with the hydrocarbon feedstock to form an extraction mixture, and subsequently the extraction mixture may be fed into an extraction vessel. In embodiments, subcritical or supercritical $CO_2$ may be used in combination with or without water as other solvent, and a solvent-modifier may also be introduced to improve selectivity of the tunable solvent toward certain classes of heteroatom compounds. When a solvent-modifier is used, the pressure of the tunable solvent may be shifted from the supercritical region toward the subcritical region in such a manner that the least polar solutes are ejected at the beginning of the pressure reduction, and subsequently the most polar compounds get ejected at later stages. The selectivity of the tunable solvents may be controlled during solute recovery, such that the heteroatom compounds may be separated or ejected from the solvent system in a series of vessels by controlling or reducing the pressure in the vessels.

The methods for separating or extracting organic heteroatom compounds and polynuclear aromatic hydrocarbons from a hydrocarbon feedstock according to various embodiments may include tuning the aqueous solvent to selectively form solvent complexes with at least a portion of the heterocyclic organic compounds and the organometallic compounds in the hydrocarbon feedstock, whereby the extraction mixture separates into at least a heteroatom-compound rich phase and a heteroatom-compound lean phase. The tuning of the aqueous solvent may be carried out in the extraction vessel or before the aqueous solvent enters the extraction vessel, and in either case before or after the aqueous solvent is mixed with the hydrocarbon feedstock. The heteroatom-compound rich phase contains substantially all of the solvent complexes, and the heteroatom-compound lean phase has a substantially greater concentration of polynuclear aromatic hydrocarbons than the heteroatom-compound rich phase. The tuning of the aqueous solvent will now be described.

The hydrocarbon feedstock may contain varying types and amounts of heteroatom compounds. By adjusting the solubility parameters of a particular organic heteroatom compound targeted for extraction, impurities in the hydrocarbon feedstock may be selectively separated from the hydrocarbon feedstock using the tunable solvent. In an illustrative embodiment, solubility parameters of a particular organic heteroatom compound may be adjusted by exploiting the polarity of any target organic heteroatom compound. In embodiments, the tunable solvent may be modified by adjusting at least one of the pressure, temperature, and pH of the solvent system so that the target organic heteroatom compound is maintained as a solute in the solvent system. Once the organic heteroatom compound is solvated, further adjustment of at least one of the pressure, temperature, and pH of the solvent system may reverse the solvation, whereby the heteroatom compound can be easily recovered as an aggregate, a precipitate, or the like.

During the separation process in an extraction vessel, supercritical carbon dioxide may promote the movement of heteroatom compounds from a primarily hydrocarbon phase and toward a primarily aqueous phase of the tunable solvent. Supercritical $CO_2$ has low viscosity and sufficient diffusivity to allow it to penetrate the hydrocarbon phase and access the targeted heteroatom compounds. A reversible ionic liquid may be formed when $CO_2$ reacts with water to form carbonic acid. Dissociated carbonic acid is ionic in nature. The ions in the carbonic acid may form temporary complexes with the targeted heteroatom compounds, based on the conditions used to tune the tunable solvent. Heteroatom compounds exhibit some amount of polar behavior due to electronegativity differences between the sulfur-carbon bonds, nitrogen-carbon bonds, or metal-carbon bonds present in the heteroatom compounds.

As a result of the polar properties of the heteroatom compounds, the heteroatom compounds move into the aqueous phase, and extraction is realized through formation of a complex with carbonic acid ions. The ionic carbonic acid formation may be a function of pressure, temperature, and salt concentration in the extraction vessel. The concentration ratio of carbonic acid ions to bicarbonate ions ($HCO_3^-$) increases with the increase in temperature and pressures in the range of about 1 bar to about 300 bar. Dissociated carbonic acid drives the extraction of the polar compounds. The selectivity of this temporary complex formation between the dissociated carbonic acid and the heteroatom compounds is dependent on at least one of the molecular structure of the heteroatom compound and any electronegativity difference between the carbon and heteroatoms in the heteroatom compound. Electronegativity differences may relate to strengths of dipole moments—that is the polarity—of the heteroatom compounds and also may relate to extraction efficiency at a given set of tuning parameters.

In embodiments, the tunable solvent may be tuned or modified by adjusting the pressure of the solvent system so that the solvent is tuned to attract or complex with a target organic heteroatom compound that has a certain polarity. By using such a selective solvent, interference from impurities that are not the target organic heteroatom compound may be less likely than in other separation processes. For example, separation processes that separate impurities based on, for example, the boiling point and condensation point of impurities, may be likely to separate impurities other than the target organic heteroatom compound, particularly ones that have a similar boiling point as the target organic heteroatom compound. In contrast, tunable solvents used in the methods according to embodiments may be precisely tuned so that they selectively separate only a target heteroatom compound or small class of heteroatom compounds.

In embodiments, the tunable solvent may be tuned or modified, such as by adjusting the pressure of the solvent system, so that the tunable solvent separates the organic heteroatom compounds from the hydrocarbons. For example, in embodiments, the tunable solvent may be tuned or modified to attract or complex with the most polar organic heteroatom compound as a solute in the solvent system. In embodiments, the tunable solvent may be tuned or modified to attract organic heteroatom compounds having even weak polarity, such as, for example, weak dipole moments.

In addition to pressure modification, temperature modification may be used to tune the equilibrium of the tunable solvent system. For example, temperature may be used to affect the solubility of heterocyclic compounds. Increased solubility of the heterocyclic compounds may increase the extraction and selectivity of the solvent-organic system and, thereby, temperature may be used to fine-tune the tunable solvent.

In the methods for separating or extracting organic heteroatom compounds and polynuclear aromatic hydrocarbons from a hydrocarbon feedstock according to embodiments, the hydrocarbon feedstock, such as, for example, crude oil or crude oil fraction, may be contacted with a tunable solvent that is capable of being modified, or tuned, to attract one or more organic heteroatom compounds into the solvent system as a solute. Contacting of the hydrocarbon feedstock with the tunable solvent may include feeding the hydrocarbon feedstock into a contactor or an extraction vessel, and feeding the aqueous solvent into the contactor or extraction vessel to form an extraction mixture of the aqueous solvent with the hydrocarbon feedstock. The tunable solvent may be formed from pressurized carbon dioxide, water, and optional modifiers. In embodiments, the tunable solvent may be pre-mixed with the hydrocarbon feedstock to form the extraction mixture, and the extraction mixture may be fed to the extraction vessel. Changes in pressure of the solvent system can be used to tune the tunable solvent to attract specific organic heteroatom compounds into the solvent system as a solute. Accordingly, the methods may include establishing an extraction-vessel pressure and an extraction-vessel temperature of the extraction mixture in the extraction vessel that together tune the aqueous solvent to selectively form a solvent complex with the at least one organic heteroatom compound.

The solubility of aqueous phase carbon dioxide may increase with respect to increasing pressure of the solvent system employed in the methods according to embodiments. In addition, the solubility of gaseous carbon dioxide in water increases as the temperature of the solvent system decreases. However, to maintain supercritical behavior of carbon dioxide in the solvent system, according to embodiments, the temperature and the pressure of the solvent system may be maintained at a temperature greater than the critical temperature and pressure greater than the critical pressure of carbon dioxide. As a result, the combined effect of the carbon dioxide and water in the tunable solvent achieves unique properties that allow the solvent to be used to attract or complex with heteroatom compounds from the hydrocarbon feedstock into the solvent system as a solute.

The carbon dioxide in the tunable solvent system according to embodiments may play multiple roles in the heteroatom compound extraction or separation process. Supercritical carbon dioxide may diffuse through the hydrocarbon feedstock, because it has good diffusivity and lesser viscosity than do other solvents, which allows the carbon dioxide to better initiate the mass transfer that attracts the organic heteroatom compounds into the solvent system as a solute. For example, in embodiments, the polar nature of heteroatom compounds in general may bring the organics into a reversible aqueous phase of the solvent.

In embodiments, the temperature of the solvent system, the pressure of the solvent system, or both, may be adjusted to tune the solvent system to contain more or fewer ions, such as, for example, $HCO_3^-$, thereby making the solvent system more or less attractive to polar refractory heteroatom compounds or to tune the solvent system's ability to form complexes between the tunable solvent and the organic heteroatom compound. To remove target heteroatom compound components, such as, for example, target organic sulfur compounds, target organic nitrogen compounds, target organometallic compounds, or combinations thereof, properties such as boiling point, as well as the chemical structures of the target heteroatom compounds themselves, may affect temperature and pressure parameters that result in selectivity of the solvent system. Non-limiting examples of heteroatom compounds that may be removed from hydrocarbon feedstocks in various embodiments include pyrroles, pyridines, quinolines, indoles, carbazoles, benzothiophenes, thiophenes, dibenzothiophenes, 7,8,9,10-tetrahydro-benzo[b]naphtho[2,3-d]thiophene, nickel-tetraphenyl-porphyrin, and vanadyl-tetraphenyl-porphyrin. It should be understood that the heteroatom compounds specifically listed are only illustrative and are not intended to be an exhaustive list of all heteroatom compounds that may be removed according to embodiments of this disclosure.

The heteroatom compounds that may be removed from hydrocarbon feedstock according to various embodiments may have varieties of chemical structures. Thus, the compounds that are to be removed from the hydrocarbon feedstock will have an impact and can determine the appropriate amount of solvent tuning required, such as, for example, adjustments of at least one of the pressure and temperature of the solvent system. Additionally, in embodiments, the selection of a tunable solvent for the separation of a specific organic heteroatom compound from hydrocarbons may impact the mass transfer of the organic heteroatom compounds from a hydrocarbon phase to a solvent phase that result from phase separation of the extraction mixture.

A single stream or a series of streams of tunable solvents may be used for selectively separating heteroatom compounds, such as, for example, at least one of organic sulfur compounds, organic nitrogen compounds, and organometallic compounds, from hydrocarbons. In embodiments, the separation may proceed by running the tunable solvent and the hydrocarbons in a series of cross-current or counter-current contactors or extraction vessels, such as, for example, packed bed contactors, fluidized bed contactors, and baffled contactors.

Without intending to be bound by any particular theory, it is believed that because various organic heteroatom compounds have polarities, they can be separated from a hydrocarbon phase into an aqueous phase of the solvent through the activity of $HCO_3^-$ ions present in the tunable solvent. It is believed that temporary complexes may form between the polar heteroatom compounds and the $HCO_3^-$ ion. For example, a temporary complex that is formed between dibenzothiophene and $HCO_3^-$ is:

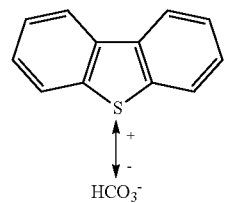

Organic heteroatom compounds containing nitrogen may also have polar behavior. However, unlike organic sulfur compounds, $HCO_3^-$ or $H^+$ may attract the organic nitrogen compounds because, in certain compounds, the nitrogen bond may have a positive or negative polarity. For example, in carbazole, the N—H bond may take on a positive or negative polarity and, thus, the following complexes may be formed between the tunable solvent and carbazole:

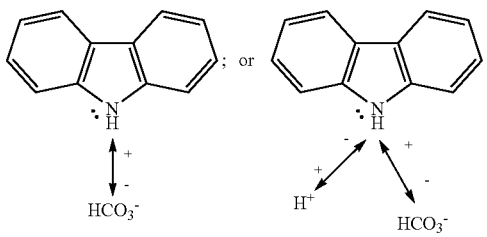

The previous depictions of heteroatom complexes are illustrative only and are not intended to limit the scope of any embodiment. Similar reaction mechanisms may occur with respect to separations of other organic heteroatom compounds such as, for example, organic sulfur-containing heterocyclic compounds, organic nitrogen-containing heterocyclic compounds, and organometallic compounds.

The tunable and switchable smart solvent system for removing or extracting of heteroatom compounds from crude fractions is nontoxic, nonflammable, recyclable, environmentally friendly, without serious disposal issues, and not susceptible to causing cross-contamination of crude fractions. As will be described in greater detail, once heteroatom compounds are removed from the hydrocarbon feedstock, PAHs may also be recovered from the resulting heteroatom-compound lean stream in an aprotic solvent system, optionally containing a protic co solvent. Because both PAHs and heteroatom compounds are generally soluble in aprotic solvent systems, while heteroatom compounds (but not PAHs) are soluble in the tunable solvent system including carbon dioxide, in the extraction system according to embodiments the heteroatom compounds are removed first from the hydrocarbon feedstock, followed by the PAH compounds.

Figure 3:
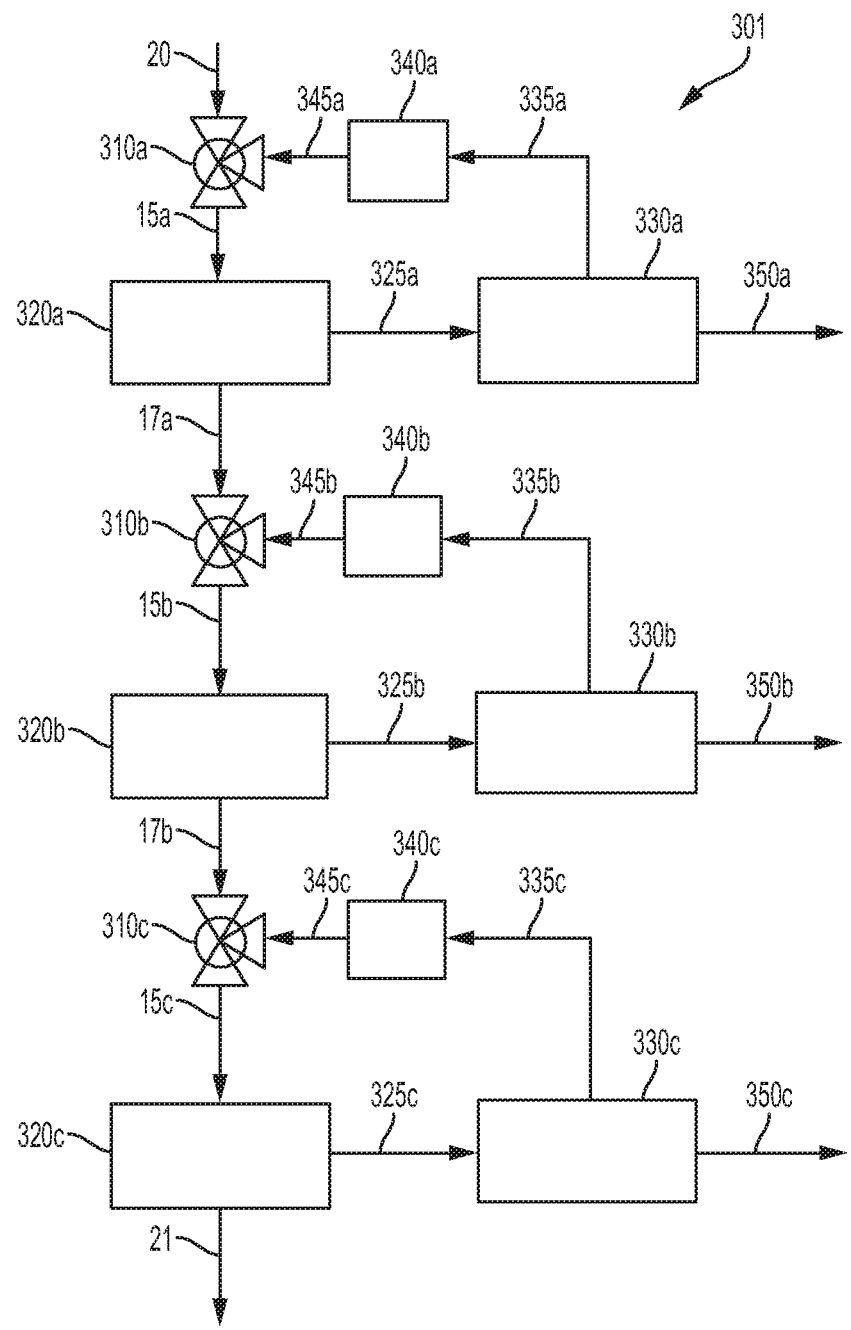
FIG. 3 is a schematic diagram of components of an extraction system according to FIG. 2 for separating and extracting organic heteroatom compounds in embodiments of methods for separating and extracting organic heteroatom compounds and polynuclear aromatic hydrocarbons from a hydrocarbon feedstock described in embodiments.

Referring again to the extraction system 200 of FIG. 2, which may be implemented in embodiments of methods for separating or extracting organic heteroatom compounds and polynuclear aromatic hydrocarbons from a hydrocarbon feedstock, the heteroatom-compound extraction system 210 may be configured as a step-wise HC extraction system 301, shown schematically in FIG. 3. According to embodiments, the heteroatom-compound extraction system 210 of FIG. 2 may be configured as a post-separation HC extraction system 502, shown schematically in FIG. 5. Both the step-wise HC extraction system 301 and the post-separation HC extraction system 502 include multiple extraction vessels (such as 320, 320a, 320b, 320c), of which the extraction vessel 320 of FIG. 4 is one illustrative embodiment.

Figure 5:
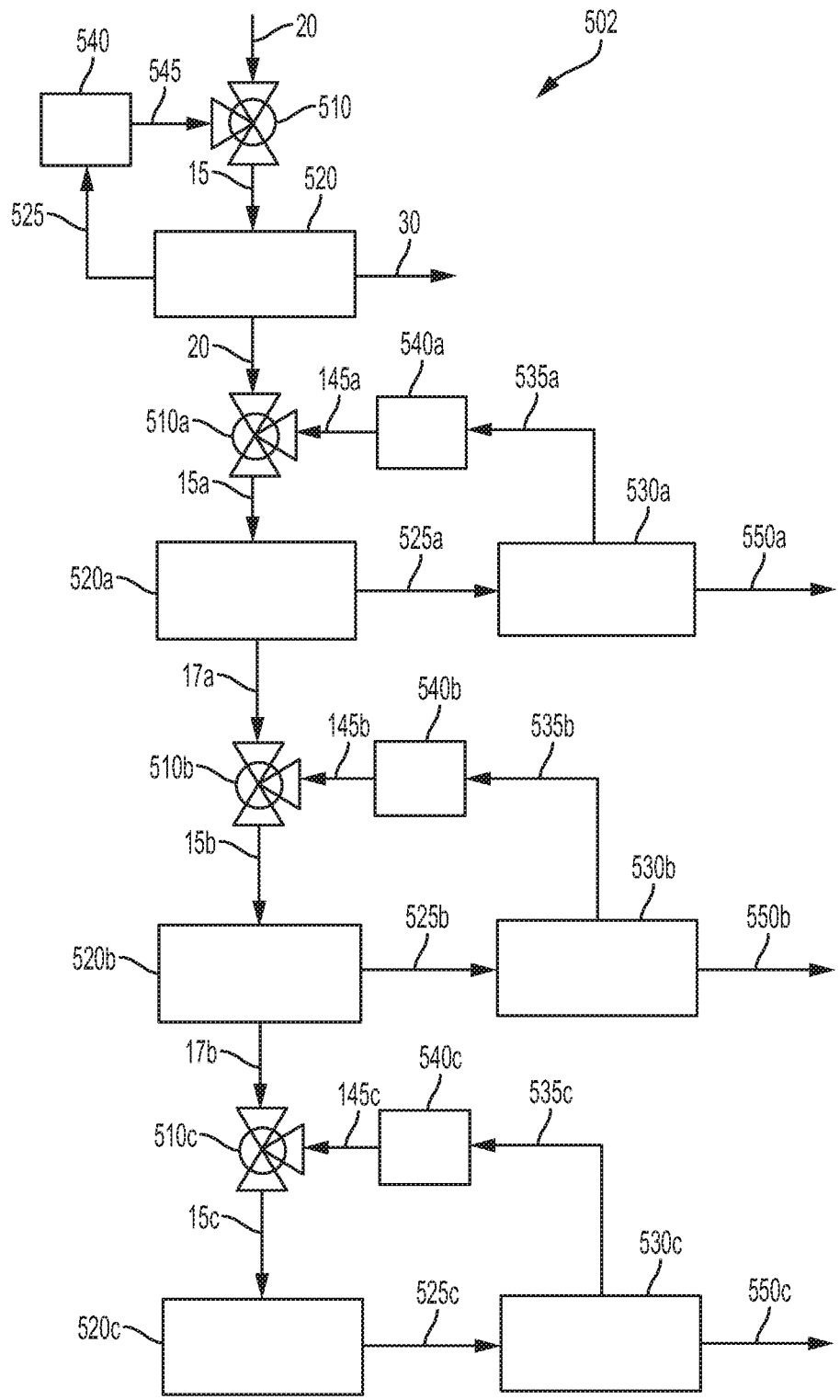
FIG. 5 is a schematic diagram of components of an extraction system according to FIG. 2 for separating and extracting organic heteroatom compounds in embodiments of methods for separating and extracting organic heteroatom compounds and polynuclear aromatic hydrocarbons from a hydrocarbon feedstock described in embodiments.

With reference to FIG. 3 and FIG. 5, in the step-wise HC extraction system 301, the hydrocarbon feedstock 20 is subjected to multiple extractions of heteroatom compounds, in which each extraction removes a portion of the heteroatom compounds according to their polarities. The heteroatom-compound lean stream leaves the step-wise HC extraction system 301 after the multiple extractions of the heteroatom compounds. In the post-separation HC extraction system 502 (depicted in FIG. 5), the hydrocarbon feedstock 20 is subjected to an initial extraction of substantially all of the heteroatom compounds, such as from 80% to 100%, from 90% to 100%, from 95% to 100%, from 98% to 100%, or from 98% to 99%. The heteroatom-compound lean stream leaves the post-separation HC extraction system 502 after the initial extraction, and the heteroatom-compound rich stream 20 is subjected to further extractions to remove one or more additional portions of the heteroatom compounds according to their polarities.

Whether configured as a step-wise HC extraction system 301 (FIG. 3) or a post-separation HC extraction system 502 (FIG. 5), the heteroatom-compound extraction system 210 (FIG. 2) according to embodiments includes at least one extraction vessel 320. An embodiment of an extraction vessel 320 is provided in FIG. 4. The extraction vessel 320 includes an extraction-vessel body 400. An extraction feed 15 may be introduced into the bottom of extraction-vessel body 400, such as by bottom spray nozzles 412. In embodiments, the extraction feed 15 may include a mixture of hydrocarbon feedstock and tunable solvent formed prior to introduction of the extraction feed 15 into the extraction-vessel body 400. For example, as shown in FIG. 3, the hydrocarbon feedstock 20 may be mixed with tunable solvent from first solvent input 345a in a first three-way valve 310a to form first extraction feed 15a before being introduced into a first extraction vessel 320a. In embodiments, the extraction feed 15 may be the hydrocarbon feedstock, such that mixture of the hydrocarbon feedstock occurs within the extraction-vessel body 400. A tunable solvent feed 18 may introduce tunable solvent into the top of the extraction-vessel body 400, such as by top spray nozzles 414.

Figure 4:
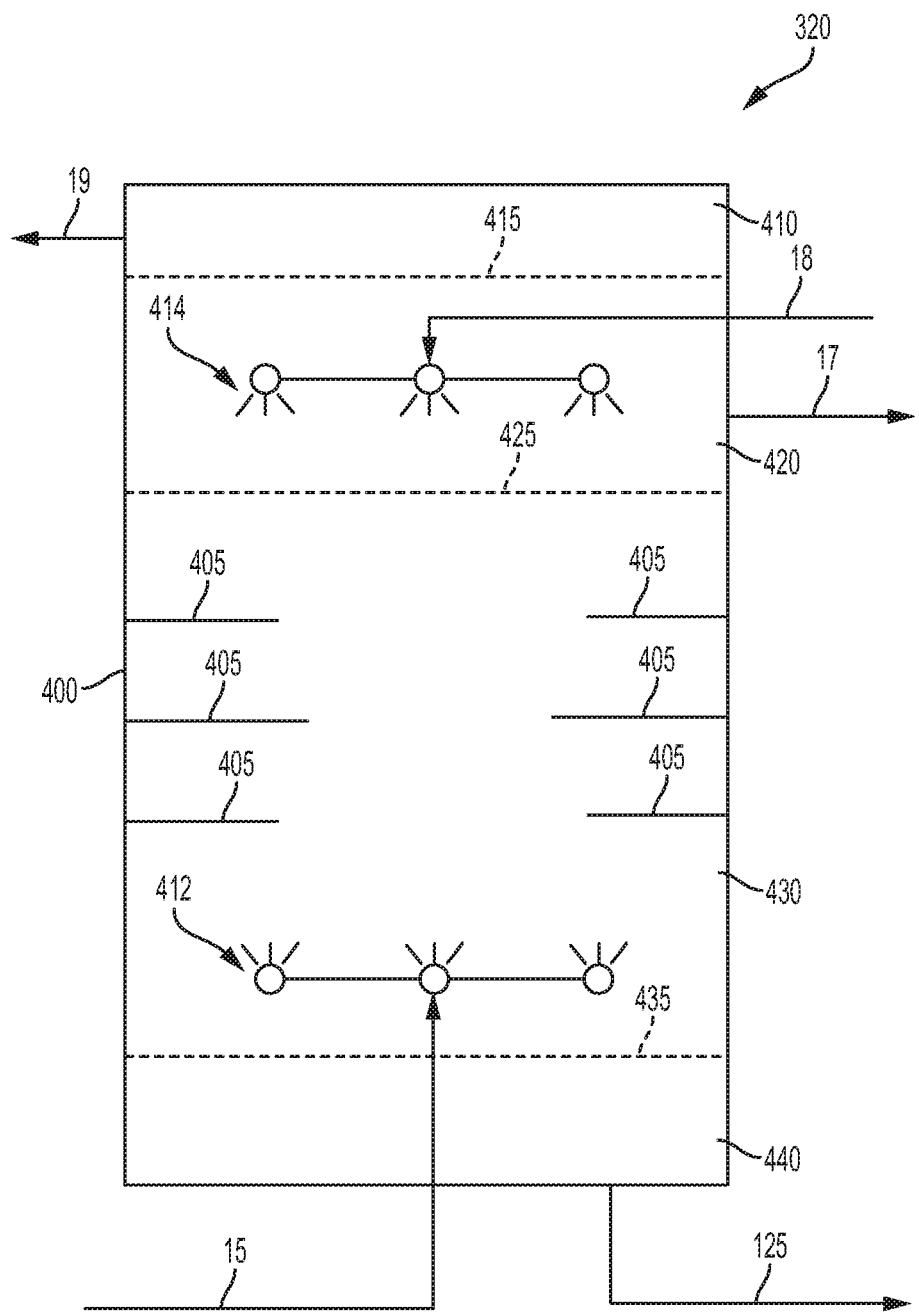
FIG. 4 is a schematic of an extraction vessel for separating and extracting organic heteroatom compounds using a tunable smart solvent system described in embodiments.

Referring to FIG. 4, as the extraction feed 15 enters the extraction-vessel body 400, droplets and sprays of hydrocarbons in the extraction feed 15 may flow upward, such as by spray propulsion and by filling the bottom of the extraction-vessel body 400. Droplets and sprays of the tunable solvent from the tunable solvent feed 18 may flow downward in the extraction-vessel body 400, such as by spray propulsion and gravitational forces. In embodiments, the extraction feed 15 and the tunable solvent may be tailored such that the density of the tunable solvent is greater than the density of the hydrocarbons in the extraction feed 15. This difference in density may cause the tunable solvent to contact the components of the extraction feed 15 and traverse through the hydrocarbon phase. Thus, in embodiments, the extraction feed 15 and the tunable solvent proceed in counter-flow contact within the extraction-vessel body 400, thereby increasing residence time of the contact between the extraction feed 15 and the tunable solvent. The extraction-vessel body 400 may optionally include structures such as baffles 405 or rotating mixing devices (not shown) to facilitate intermixing of the components of the extraction feed 15 with the tunable solvent.

In embodiments, droplets derived from components of the extraction feed 15 and the tunable solvent may coalesce to form separate homogeneous phases. In embodiments in which the hydrocarbons of the extraction feed 15 are more dense than the tunable solvent, the flow of these components into the extraction-vessel body 400 may be reversed (that is, the extraction feed 15 may be introduced into the top of the extraction-vessel body 400, and the tunable solvent feed 18 may be introduced into the bottom of the extraction-vessel body 400). During contact between the extraction feed 15 and the tunable solvent, organic heteroatom compounds may be attracted into the solvent phase of the tunable solvent as solutes, for example, by forming complexes with the tunable solvent. Thus, after the extraction feed 15 and the tunable solvent interact for a period of time, a heteroatom-compound lean stream 17 may be extracted from the middle of the extraction-vessel body 400. The tunable solvent, which has become rich with organic heteroatom compounds, may be removed from the bottom of the extraction-vessel body 400 as a heteroatom-compound rich stream 125.

During the contacting of the extraction feed 15 and the tunable solvent in the extraction vessel 210, at least one of the pressure and temperature within the extraction-vessel body 400 may be modified to tune the solvent to have ions that attract the most polar components in the extraction feed 15. Target organic heteroatom compounds, such as, for example, organic sulfur heterocyclic compounds, organic nitrogen heterocyclic compounds, and organometallic compounds naturally have polarities in the molecular structures. The relative polarities of these compounds may vary. For example, some organometallic compounds may exhibit more polar behavior (that is, may have a greater polarity) than do sulfur-containing heterocyclic compounds or nitrogen-containing heterocyclic compounds. To illustrate the polar behavior of a heterocyclic compound, consider that dibenzothiophene has a sulfur atom that is more electropositive than its other, bonded carbon atoms. Particularly, the delocalized electrons of dibenzothiophene may be drawn inside of its ring structure and, thus, the sulfur atoms' outer shell may also be drawn inside toward the electrons. As a result, the sulfur atom attached to the rings becomes electropositive and provides the dibenzothiophene with polar properties.

Referring again to FIG. 4, during the contact of the extraction feed 15 and the tunable solvent in the extraction-vessel body 400, multiple phases are formed that accomplish the separation of the extraction feed 15 into the heteroatom-compound lean stream 17 and the heteroatom-compound rich stream 125. In particular, the fluids resident in the extraction-vessel body 400 may be divided into four phase regions 410, 420, 430, and 440. Each phase region is separated from adjacent phase region(s) by phase boundaries 415, 425, 435, represented in FIG. 4 by dotted lines. According to embodiments, the top of the extraction-vessel body 400 may comprise solvent phase 410 that includes or consists essentially of supercritical and subcritical carbon dioxide from the tunable solvent. Below phase boundary 415 is lean phase 420, which may include hydrocarbons lean in heteroatom compounds and carbon dioxide. In embodiments, the heteroatom-compound lean stream 17 extracted from the extraction-vessel body 400 may be extracted from the lean phase 420. Below phase boundary 425 is mixed phase 430, which may include a mixture of aqueous carbon dioxide, water, hydrogen ions, carbonic acid, hydrocarbons, and supercritical carbon dioxide. At the bottom of the extraction vessel is rich phase 440, which may comprise aqueous carbon dioxide, hydrogen ions, water, carbonic acid, and solvent rich in heteroatom compounds as solutes. The heteroatom-compound rich stream 125 that is extracted from the extraction vessel may be extracted from rich phase 440.

The development of phases in the extraction-vessel body 400 may be influenced by the pressure of the solvent system within the extraction-vessel body 400. For example, complexes between organic heteroatom compounds and the tunable solvent may be driven by pressure increases or decreases in the solvent system. Without intent to be bound by theory, it is believed that an increase of pressure on the tunable solvent promotes a shift in an equilibrium between $H_2CO_3(aq)$ and $H^+(aq)+HCO_3^-(aq)$. In addition, the solubility of carbon dioxide in water increases as the temperature of the solvent system increases. However, once a complex forms between the $HCO_3^-$ and a heteroatom compound, a reaction is promoted by which $CO_2$ forms $H_2CO_3(aq)$ in the water, which can dissociate into $H^+(aq)+HCO_3^-(aq)$ to maintain the concentration of $HCO_3^-(aq)$. Thus, equilibrium is established immediately after a complex forms through the disassociation of an equivalent of $H_2CO_3(aq)$ into $H^+(aq)+HCO_3^-(aq)$. Accordingly, in embodiments, increasing the pressure in the extraction-vessel body 400 promotes the formation of the complex between one $HCO_3^-(aq)$ ion and one molecule of the organic heteroatom compound. Similarly, a decrease in pressure will drive the previous mechanism in the opposite direction and will either decrease the formation of complexes between ions and organic heteroatom compounds or decompose any complexes that already exist in solution. Thus, it should be apparent that the organic heteroatom compound may be ejected from the solvent or may be made to aggregate or precipitate out of the solvent by decreasing the pressure.

The pressure applied in the extraction-vessel body 400 may be varied depending on the tunable solvent that is used and the target organic heteroatom compounds sought to be extracted. In embodiments, the pressure may be varied to produce more or less $HCO_3^-$ to attract specific organic heteroatom compounds according to the polarity of the specific heteroatom compounds. In embodiments, the pressure in the extraction-vessel body 500 during an extraction of heteroatom compounds may be from about 2 bar to about 300 bar, such as from about 20 bar to about 275 bar. In embodiments, the pressure in the contractor may be from about 50 bar to about 250 bar, such as from about 75 bar to about 225 bar. In yet embodiments, the pressure in the extraction vessel may be from about 100 bar to about 200 bar. In still embodiments, the pressure in the contractor may be from about 125 bar to about 175 bar. In still embodiments, the pressure in the extraction vessel may be from about 2 bar to about 20 bar, such as about 18 bar. It should be understood that the previous ranges are intended to include each point between the disclosed endpoints, and that each pressure point between 2 bar and 300 bar is envisioned in this disclosure.

Referring to FIG. 2, the temperature in the extraction vessel 210 may be varied according to the tunable solvent that is used and the target organic heteroatom compounds being extracted. In embodiments in which carbon dioxide is the tunable solvent, the temperature in the extraction vessel 210 may be greater than or equal to the critical temperature of carbon dioxide, such as about 20° C. greater than the critical temperature of carbon dioxide. In embodiments, the temperature in the extraction vessel 210 may be greater than or equal to about 40° C. greater the critical temperature of carbon dioxide, such as about 60° C. greater than the critical temperature of carbon dioxide. In embodiments, the temperature in the extraction vessel 210 may be less than or equal to about 150° C., such as less than or equal to about 80° C.

Referring to FIG. 3, in the step-wise HC extraction system 301, multiple portions of heteroatom compounds are extracted sequentially from the hydrocarbon feedstock 20, and a heteroatom-compound lean stream 21 that emerges from the step-wise HC extraction system 301 is transferred to a PAH extraction system 240 (FIG. 2) after the multiple portions of heteroatom compounds have been removed. In the step-wise HC extraction system 301, the hydrocarbon feedstock 20 may be mixed with tunable solvent from a first solvent input 345a in a first three-way valve 310a, for example, to form a first extraction feed 15a that is introduced into a first extraction vessel 320a. The first extraction vessel 120a may be configured in the same manner as the extraction vessel 320 of FIG. 4, described previously. The hydrocarbon feedstock 20 may contain crude oil or crude oil fractions, particularly crude oil fractions having a boiling point range of from about 165° C. to about 430° C. The hydrocarbon feedstock 20 may contain high levels of heteroatom compounds. The temperature of the hydrocarbon feedstock 20 may be is adjusted or maintained to from 25° C. to about 150° C., depending on the type of heteroatom compounds present in the hydrocarbon feedstock 20.

A first heteroatom-compound rich stream 325a leaves the first extraction vessel 320a and is transferred to a first ejector vessel 330a. In the first ejector vessel 330a, the first heteroatom-compound rich stream 325a, which contains a mixture of heteroatom compounds and tunable solvent, may be depressurized or cooled to cause the heteroatom compounds to come out of solution. When the first ejector vessel 330a is depressurized, the reversible carbonic acid becomes less acidic as carbonic acid reverts to aqueous $CO_2$ and ejects the heteroatom compounds from the solvent phase. In embodiments, the depressurization of the first ejector vessel 330a may occur continuously or semi-continuously during the ejection process. In embodiments, the depressurization may be conducted in stages in a series of different recovery vessels, so as to eject the least polar heteroatom compounds first, followed by filtering or adsorption of the heteroatom compounds.

The heteroatom compounds may be transferred out of the first ejector vessel 330a as a first heteroatom-compound recovery stream 350a to be transferred to a heteroatom-compound fractionator 240 (see FIG. 2). In embodiments, the first heteroatom-compound recovery stream 350a may be formed by filtering the heteroatom compounds in the first ejector vessel 330a, adsorbing the heteroatom compounds onto an adsorbent, or by solvating the heteroatom compounds in an aromatic solvent. The tunable solvent components such as carbon dioxide and water in the first ejector vessel 330a may be transferred as a first solvent-recycle stream 335a to a first solvent regenerator 340a. The first solvent regenerator 340a may then feed the tunable solvent back to additional portions of hydrocarbon feedstock 20 through the first solvent input 345a.

A first heteroatom-compound lean stream 17a is transferred from the first extraction vessel 320a to a second three-way valve 310b to be mixed with tunable solvent from a second solvent input 345b and transferred to a second extraction vessel 320b as a second extraction feed 15b. The second extraction feed 15b may be adjusted to or maintained at a temperature of from about 25° C. to about 150° C. In the second extraction vessel 320b, an additional portion of heteroatom compounds is removed from the second extraction feed 15b. In embodiments, the conditions in the second extraction vessel 320b may be chosen to target extraction of heteroatom compounds having a lesser degree of polarity than that of the heteroatom compounds extracted from the first extraction feed 15a in the first extraction vessel 320a. For example, the pressure of the second extraction vessel 320b may be maintained at a greater level than was used to conduct the extraction in the first extraction vessel 320a. Similar to the first extraction process in the first extraction vessel 320a, a second heteroatom-compound rich stream 325b is transferred from the second extraction vessel 320b to a second ejector vessel 330b. The second ejector vessel 330b is depressurized. When the second ejector vessel 330b is depressurized, the reversible carbonic acid becomes less acidic as carbonic acid reverts to aqueous $CO_2$ and ejects the heteroatom compounds from the solvent phase. In embodiments, the depressurization of second ejector vessel 330b may occur continuously or semi-continuously during the ejection process. In embodiments, the depressurization may be conducted in stages in a series of different recovery vessels, so as to eject the least polar heteroatom compounds first, followed by filtering or adsorption of the heteroatom compounds.

A second heteroatom-compound recovery stream 350b may be transferred to a heteroatom-compound fractionator 240 (see FIG. 2) and the components of the tunable solvent in the second ejector vessel 330b may be transferred as a second solvent-recycle stream 335b to a second solvent regenerator 340b. In embodiments, the second heteroatom-compound recovery stream 350b may be formed by filtering the heteroatom compounds in the second ejector vessel 330b, adsorbing the heteroatom compounds onto an adsorbent, or by solvating the heteroatom compounds in an aromatic solvent. The second solvent regenerator 340b may then feed the tunable solvent back to additional portions of the first heteroatom-compound lean stream 17a through the second solvent input 345b.

A second heteroatom-compound lean stream 17b is transferred from the second extraction vessel 320b to a third three-way valve 310c to be mixed with tunable solvent from a third solvent input 345c and transferred to a third extraction vessel 320c as a third extraction feed 15c. The third extraction feed 15c may be adjusted to or maintained at a temperature of from about 25° C. to about 150° C. In the third extraction vessel 320c, an additional portion of heteroatom compounds is removed from the third extraction feed 15c. In embodiments, the conditions in the third extraction vessel 320c may be chosen to target extraction of heteroatom compounds having a lesser degree of polarity than those of the heteroatom compounds extracted from the first extraction feed 15a in the first extraction vessel 320a and from the second extraction feed 15b in the second extraction vessel 320b. For example, the third extraction vessel 320c may be maintained at a greater pressure than was used to conduct the extractions in the first extraction vessel 320a and the second extraction vessel 320b. Similar to the first extraction process in the first extraction vessel 320a, a third heteroatom-compound rich stream 325c is transferred from the third extraction vessel 320c to a third ejector vessel 330c. The third ejector vessel 330c is depressurized. When the third ejector vessel 330c is depressurized, the reversible carbonic acid becomes less acidic as carbonic acid reverts to aqueous $CO_2$ and ejects the heteroatom compounds from the solvent phase. In embodiments, the depressurization of third ejector vessel 330c may occur continuously or semi-continuously during the ejection process. In embodiments, the depressurization may be conducted in stages in a series of different recovery vessels, so as to eject the least polar heteroatom compounds first, followed by filtering or adsorption of the heteroatom compounds.

A third heteroatom-compound recovery stream 350c may be transferred to a heteroatom-compound fractionator 240 (see FIG. 2) and the components of the tunable solvent in the third ejector vessel 330c may be transferred as a third solvent-recycle stream 335c to a third solvent regenerator 340c. In embodiments, the third heteroatom-compound recovery stream 350c may be formed by filtering the heteroatom compounds in the third ejector vessel 330c, adsorbing the heteroatom compounds onto an adsorbent, or by solvating the heteroatom compounds in an aromatic solvent. The third solvent regenerator 340c may then feed the tunable solvent back to additional portions of the second heteroatom-compound lean stream 17b through the third solvent input 345c.

In a non-limiting illustrative embodiment, the first extraction vessel 320a may be operated at pressure $P_1$ from 2 bar to 300 bar, so as to target heteroatom compounds having relatively high polarities. The second extraction vessel 320b may be operated at pressure $P_2$ from 2 bar to 300 bar, where $P_2 > P_1$, so as to target heteroatom compounds having polarities lesser than those of the heteroatom compounds extracted in the first extraction vessel 320a. The third extraction vessel 320c may be operated at pressure $P_3$ from 2 bar to 300 bar, where $P_3 > P_2 > P_1$, so as to target heteroatom compounds having the lowest polarities in the original hydrocarbon feedstock.

From the third extraction vessel 320c, a heteroatom-compound lean stream 30 emerges as a substantially hydrocarbon phase rich in the polynuclear aromatic hydrocarbons that were present in the hydrocarbon feedstock 20, but from which all or a substantial portion such as 80%, 90%, 95%, 99%, or 99.9% of the heteroatom compounds have been removed. It should be understood that though the step-wise HC extraction system 301 has been illustrated in FIG. 2 as including only three extraction vessels, namely, first extraction vessel 320a, second extraction vessel 320b, and third extraction vessel 320c, that more or fewer extraction vessels may be employed. For example, the step-wise HC extraction system 301 may include only two extraction vessels or may include four, five, ten, twenty, or more than twenty extraction vessels, depending on the cost effectiveness of the contemplated step-wise extraction system. In particular, more than three extraction vessels may be advantageous if numerous classes of heteroatom compounds are targeted, all of which vary by a quantifiable degree of polarity, such that the conditions of the tunable solvent in the extraction vessels can be precisely tailored to extract one of the classes in each individual extraction vessel.

Referring to FIG. 5, the post-separation HC extraction system 502 is a variation of the step-wise HC extraction system 301 of FIG. 3 in that in the post-separation HC extraction system 502, the hydrocarbon feedstock 20 is subjected to an initial extraction of substantially all of the heteroatom compounds present in the hydrocarbon feedstock 20. In the post-separation HC extraction system 502, the hydrocarbon feedstock 20 may be mixed in a three-way valve 310 with tunable solvent from a solvent input 345 and transferred as an extraction feed 15 to an extraction vessel 320. The pressure and temperature conditions in the extraction vessel 320 may be adjusted to tune the tunable solvent, such that substantially all of the heteroatom compounds in the extraction feed 15 are solvated in an aqueous phase that leaves the extraction vessel 320 as a heteroatom-compound rich stream 21, while the PAH components of the extraction stream are retained in an organic phase that leaves the extraction vessel 320 as a heteroatom-compound lean stream 22. The heteroatom-compound lean stream 30 may be transferred from the extraction vessel 320 to a PAH extraction system (see FIG. 2). The heteroatom-compound rich stream 20 may be transferred to a first extraction vessel 320a after being mixed with tunable solvent from a first solvent input 345a in a first three-way valve 310a to form a first extraction feed 15a.

In the embodiment depicted in FIG. 5, the first extraction feed 15a, which is, unlike in the step-wise HC extraction system 301, nearly devoid of PAHs, may be subjected to multiple extractions of heteroatom compounds in the first extraction vessel 320a, a second extraction vessel 320b, and a third extraction vessel 320c. Heteroatom-compound rich streams 325a, 325b, 325c from the extraction vessels 320a, 320b, 320c are transferred to a respective ejector vessel 330a, 330b, 330c, from each of which a heteroatom-compound recovery stream 350a, 350b, 350c is transferred to a heteroatom-compound fractionator 240 (see FIG. 2). From the ejector vessels 330a, 330b, 330c, solvent-recycle streams 335a, 335b, 335c may be transferred to solvent regenerators 340a, 340b, 340c to be reintroduced back into the extraction vessels 320a, 320b, 320c through the solvent inputs 345a, 345b, 345c and the three-way valves 310a, 310b, 310c.

As with the step-wise HC extraction system 301 of FIG. 3, it should be understood that the post-separation HC extraction system 502 of FIG. 5 has been illustrated as including only three extraction vessels, namely, first extraction vessel 320a, second extraction vessel 320b, and third extraction vessel 320c, that more or fewer extraction vessels may be employed. For example, the post-separation HC extraction system 502 may include only two extraction vessels or may include four, five, ten, twenty, or more than twenty extraction vessels, depending on the cost effectiveness of the contemplated step-wise extraction system. In particular, more than three extraction vessels may be advantageous if numerous classes of heteroatom compounds are targeted, all of which vary by a quantifiable degree of polarity, such that the conditions of the tunable solvent in the extraction vessels can be precisely tailored to extract one of the classes in each individual extraction vessel.

Figure 6:
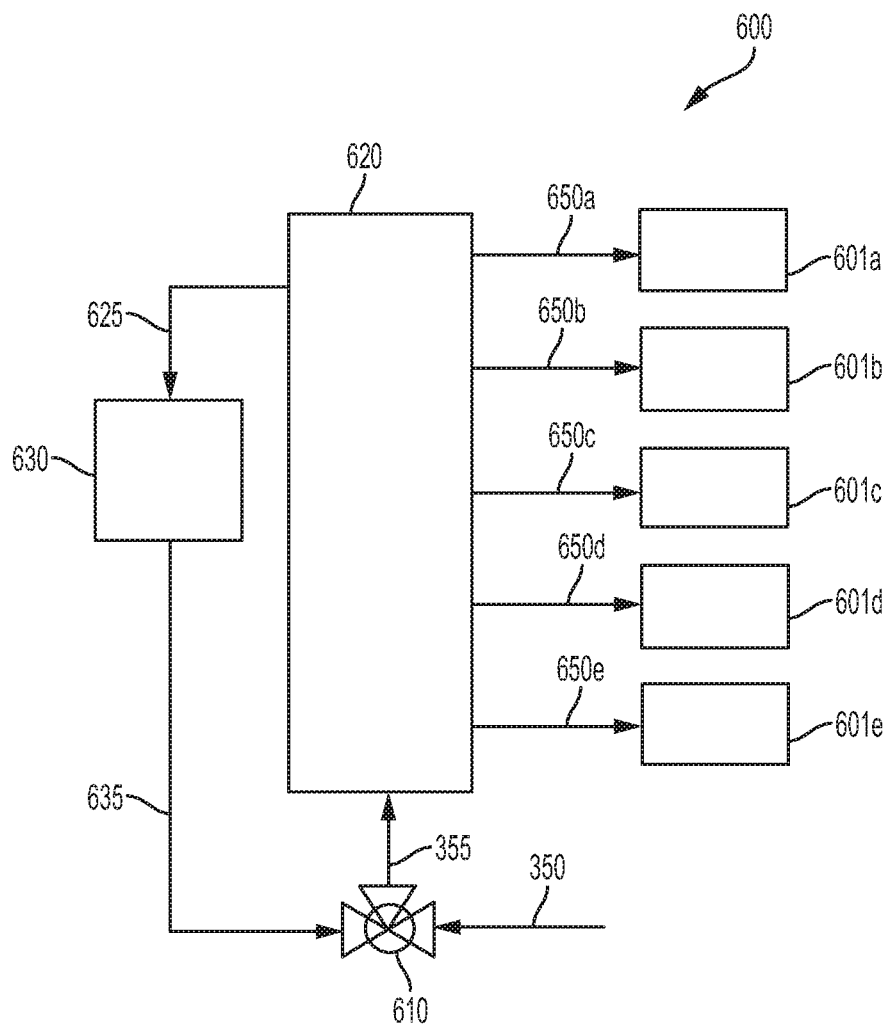
FIG. 6 is a schematic diagram of components of an extraction system according to FIG. 2 for fractionating organic heteroatom compounds from a heteroatom-rich stream in embodiments of methods for separating and extracting organic heteroatom compounds and polynuclear aromatic hydrocarbons from a hydrocarbon feedstock described in embodiments.
Figure 7:
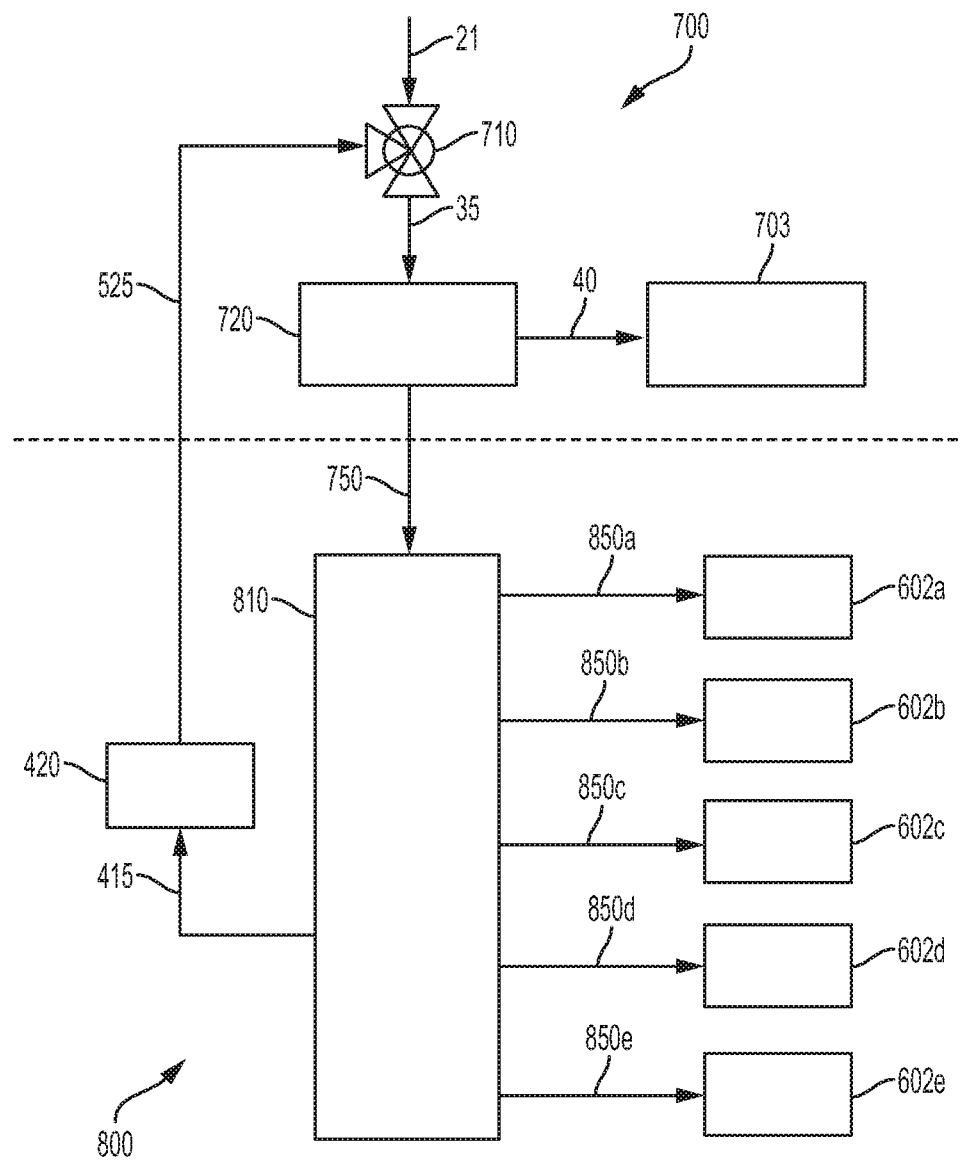
FIG. 7 is a schematic diagram of components of an extraction system according to FIG. 2 for separating and extracting polynuclear aromatic compounds from a heteroatom-lean stream in embodiments of methods for separating and extracting organic heteroatom compounds and polynuclear aromatic hydrocarbons from a hydrocarbon feedstock described in embodiments.

Referring to FIGS. 2 and 6, the heteroatom-compound fractionator 240 of the extraction system 200 will now be described. In the methods for recovering heteroatom compounds and PAHs from a hydrocarbon stream, a heteroatom-compound recovery stream 350 from the heteroatom-compound extraction system 600 may be mixed with an HC-extraction solvent system contained in HC solvent stream 635 in a three-way valve 610 or other suitable device to form an HC fractionation stream 355. The HC-extraction solvent system may include any solvents in which heteroatom compounds in the heteroatom-compound recovery stream 350 are soluble, particularly solvents most conducive to separation processes such as fractional distillation. In embodiments, the HC-extraction solvent system may include aromatic solvents, N-methylpyrrolidone (NMP), dimethylsulfoxide (DMSO), or combinations thereof.

The HC fractionation stream 355 may be introduced into a fractionation vessel 620, in which the HC fractionation stream 355 undergoes a separation process. In embodiments, the separation process is dependent on boiling point variations of various heteroatom compound components in the HC fractionation stream 355. For example, the separation process may include fractional distillation. The separation process separates the HC fractionation stream 355, which includes a mixture of heteroatom compounds, into multiple heteroatom-compound solute fractions 650a, 650b, 650c, 650d, 650e. The multiple heteroatom-compound solute fractions 650a, 650b, 650c, 650d, 650e may be recovered by any chemically suitable technique at respective heteroatom-compound recoveries 601a, 601b, 601c, 601d, 601e. In embodiments, the heteroatom-compound solute fractions 650a, 650b, 650c, 650d, 650e each may contain very pure heteroatom compounds of a particular molecular structure. A solvent-recycle stream 625 may be directed to a solvent regenerator 630 for reintroduction into the fractionation vessel 620 through the HC solvent stream 635.

Referring to FIGS. 2 and 6, the methods for recovering organic heteroatom compounds and PAHs from a hydrocarbon feedstock 20 may include transferring the heteroatom-compound lean stream 21 from the heteroatom-compound extraction system 200 or, more particularly, from an extraction vessel 240 of the heteroatom-compound extraction system 200, to a PAH extraction system 700 or, more particularly, to a PAH extractor 720 of a PAH extraction system 700. In embodiments, the PAH extractor 720 is a vessel in which the heteroatom-compound lean stream 21 is combined with an second solvent system that extracts PAH compounds from the heteroatom-compound lean stream 21. The second solvent system may be mixed with the heteroatom-compound lean stream 21 in a three-way valve 710 in fluidic communication with a PAH solvent input 525, for example, to form a PAH extraction feed 35 that is introduced into the PAH extractor 720. The second solvent system may include at least one aprotic solvent chosen from aromatic solvents, N-methylpyrrolidone (NMP), dimethylsulfoxide (DMSO), or combinations thereof, for example. In embodiments, the second solvent may further include a protic co-solvent such as water or acetic acid, for example.

In the PAH extractor 720, after sufficient residence time of about 3 minutes to about 2 hours, for example, phase separation of the components of the heteroatom-compound lean stream 21 occurs to result in a PAH-lean phase substantially devoid of PAHs and a PAH-rich phase of a mixture of PAH compounds in solvent. The PAH-lean phase may be transferred as a raffinate stream 40 to a raffinate recovery vessel 703 for additional processing such as hydrotreatment, for example. The PAH-rich phase may be transferred as a PAH recovery stream 750 to a PAH fractionator 800, which includes a PAH fractionation vessel 810. Thus, the PAH recovery stream 750 may be introduced into the PAH fractionation vessel 810, in which the PAH recovery stream 750 undergoes a separation process. In one embodiment, the separation process is dependent on boiling point variations of various PAH components in the PAH recovery stream 750. For example, the separation process may include fractional distillation. The separation process separates the PAH recovery stream 750, which includes a mixture of PAH compounds, into multiple PAH solute fractions 850a, 850b, 850c, 850d, 850e. The multiple PAH solute fractions 850a, 850b, 850c, 850d, 850e may be recovered by any chemically suitable technique at respective PAH-compound recoveries 602a, 602b, 602c, 602d, 602e. In embodiments, the PAH solute fractions 850a, 850b, 850c, 850d, 850e each may contain very pure PAH compounds of a particular molecular structure. A solvent-recycle stream 815 may be directed to a solvent regenerator 820 for reintroduction into the PAH extraction system 700 through the PAH solvent input 825, for example. In embodiments, the PAH solute fractions 850a, 850b, 850c, 850d, 850e comprise, consist essentially of, or consist of 2-4 cycle PAHs, 3-4 cycle PAHs, or 2-5 cycle PAHs in any residual solvent.

Embodiments of methods for producing the hydrocarbon raffinate, and methods for separating or extracting organic heteroatom compounds and polynuclear aromatic hydrocarbons from a hydrocarbon feedstock, have been described. The methods in general may be described as "nonconventional refining" processes, because they selectively remove some of the tenacious heteroatom compounds and 2-4 cycle PAHs, 3-4 cycle PAHs, or 2-5 cycle PAHs from crude oil and crude fractions in consecutive separation processes to eliminate a wide array of problems during hydroprocessing of crude fractions when integrated with the conventional petroleum refining process. Additionally, the removal of 2-4 cycle PAHs, 3-4 cycle PAHs, or 2-5 cycle PAHs can also mitigate particulate emission problems from transportation fuels.

The heteroatom compounds and PAHs compounds extracted by the methods described previously are present in heavier crude and are also considered nuisances during hydroprocessing operations. During hydroprocessing, the compounds contribute to deactivation of expensive catalysts and also require the processing to be conducted at greater temperatures and under greater pressures of hydrogen. Moreover, the unreacted leftover PAHs are precursors to particulate formation and contribute to pollution. In existing refinery configurations, the conversion of these heterocyclic molecules results in elemental sulfur, which is an environmental concern in terms cost and disposal. On the other hand, the removal of heteroatom compounds and PAHs compounds before hydroprocessing actually eliminates the need for high severity hydroprocessing and reduces the sulfur disposal cost, associated environmental pollutions and reduced capital investment.

The removal of heteroatom compounds and PAHs from crude fractions can improve the kinetics and cost of hydroprocessing operation in the refineries. Advantageously, the extracted compounds from crude fractions can be used as feedstock for fine chemicals, biochemicals, pharmaceuticals, and materials for organic solar cells, organic electronic materials, and photovoltaic solar energy storage. Thus, the extraction and recovery of these materials can potentially open new business lines as feedstocks for producing new generations of biochemical feedstocks, chemicals for organic semiconductors, optoelectronics devices, and organic solar cells, for example.

Various aspects of embodiments are provided below.

A first aspect includes, a method of extracting 1-4 cycle heterocyclic compounds and 2-5 cycle polynuclear aromatic hydrocarbons from a hydrocarbon feedstock, the method comprises: providing a hydrocarbon feedstock containing crude oil fractions comprising 1-4 cycle heterocyclic compounds and 2-5 cycle polynuclear aromatic hydrocarbons; determining an A/R ratio and an asphaltene concentration of the hydrocarbon feedstock; treating the hydrocarbon feedstock based upon the determination of the A/R ratio and asphaltene concentration to form a treatable hydrocarbon feedstock comprising fractions with a boiling point range of greater than 360° C.; cracking the treatable hydrocarbon feedstock in a cracker to form a treated hydrocarbon feedstock comprising fractions having a boiling point range of 165° C. to 470° C.; fractionating the treated hydrocarbon feedstock into a first fractionated stream having a boiling point range of less than 165° C., a second fractionated stream having a boiling point range of 165° C. to 470° C., and a third fractionated stream having a boiling point range of greater than 470° C.; extracting at least one targeted portion of the 1-4 cycle heterocyclic compounds from the second fractionated stream with an aqueous solvent comprising an ionic liquid formed from pressurized carbon dioxide and water; transferring to a PAH extractor a 1-4 cycle heterocyclic compound-lean stream containing the 2-5 cycle polynuclear aromatic hydrocarbons after all targeted portions of the 1-4 cycle heterocyclic compounds have been extracted from the second fractionated stream; and extracting the 2-5 cycle polynuclear aromatic hydrocarbons from the heteroatom-lean stream in the PAH extractor with a solvent system comprising an aprotic solvent.

A second aspect includes the method of the first aspect, in which the treated hydrocarbon feedstock comprises greater than 90% by weight fractions having a boiling point range of less than 470° C.

A third aspect includes the method of the first aspect, in which the hydrocarbon feedstock comprises at least one of heavy crude oil fractions, medium crude oil fractions, and mixtures thereof.

A fourth aspect includes the method of the first aspect, in which the cracking step comprises thermal cracking, steam cracking, or catalytic cracking.

A fifth aspect includes the method of the first aspect, in which the cracking step comprises catalytic cracking with a zeolite catalyst.

A sixth aspect includes the method of the first aspect, in which: the hydrocarbon feedstock is determined to have an A/R ratio from 0.5:1 to 1.5:1 and an asphaltene concentration from 2.0 to 15.0 wt %; and treating the hydrocarbon feedstock comprises: fractionating the hydrocarbon feedstock in a vacuum fractionator to form a first hydrocarbon stream with fractions having a boiling point range of 360° C. to 470° C. and a second hydrocarbon stream with fractions having a boiling point range of greater than 470° C.; deasphalting the second hydrocarbon stream in a solvent deasphalter to form a deasphalted oil stream and an asphalt fraction; and hydrocracking the deasphalted oil stream in a mild hydrocracker to form the treatable hydrocarbon feedstock.

A seventh aspect includes the method of the sixth aspect, in which the hydrocracking step is conducted at a pressure from 4 MPa to 16 MPa and a temperature from 330° C. to 440° C.

An eighth aspect includes the method of the first aspect, in which: the hydrocarbon feedstock is determined to have an A/R ratio from 0:1 to 0.5:1 and an asphaltene concentration from 0.0 wt. % to 2.0 wt. %; and treating the hydrocarbon feedstock comprises fractionating the hydrocarbon feedstock in a fractionator to form the treatable hydrocarbon stream having fractions with a boiling point range of greater than 360° C. and a second hydrocarbon stream having fractions with a boiling point range of less than 360° C.

A ninth aspect includes the method of the first aspect, in which: the hydrocarbon feedstock is determined to have an A/R ratio from 0:1 to 0.5:1 and an asphaltene concentration from 0.0 wt. % to 2.0 wt. %; and treating the hydrocarbon feedstock comprises fractionating the hydrocarbon feedstock to form a first fractionated stream having fractions with a boiling point range of less than 360° C. and the treatable feedstock having fractions with a boiling point range of greater than or equal to 360° C.

A tenth aspect includes the method of the first aspect, in which extracting at least one targeted portion of the 1-4 cycle heterocyclic compounds from the second fractionated stream comprises: extracting a first targeted portion of the 1-4 cycle heterocyclic compounds having a first polarity in a first extraction vessel operating at a first pressure; extracting a second targeted portion of the 1-4 cycle heterocyclic compounds in a second extraction vessel after extracting the first portion, the second extraction vessel operating at a second pressure greater than the first pressure, the second portion of the heteroatom compounds having a second polarity that is less than the first polarity; and extracting a third targeted portion of the 1-4 cycle heterocyclic compounds in a third extraction vessel after extracting the second portion of the 1-4 cycle heterocyclic compounds, the third extraction vessel operating at a third pressure greater than the first pressure and the second pressure, the third portion of the 1-4 cycle heterocyclic compounds having a third polarity that is less than the second polarity.

An eleventh aspect includes the method of the first aspect, in which the extraction of each targeted portion of the 1-4 cycle heterocyclic compounds from the second fractionated stream comprises: feeding into an extraction vessel separately or as a mixture: the second fractionated stream; and the aqueous solvent, whereby the combination of the second fractionated stream with the aqueous solvent in the extraction vessel forms an extraction mixture; tuning the aqueous solvent to selectively form solvent complexes with the targeted portion of the 1-4 cycle heterocyclic compounds in the extraction mixture, whereby the extraction mixture separates into at least a 1-4 cycle heterocyclic-compound rich phase and a 1-4 cycle heterocyclic-compound lean phase, the 1-4 cycle heterocyclic-compound rich phase containing the solvent complexes; removing the 1-4 cycle heterocyclic-compound lean phase from the extraction vessel as a 1-4 cycle heterocyclic-compound lean stream; removing the 1-4 cycle heterocyclic-compound rich phase from the extraction vessel as a 1-4 cycle heterocyclic-compound rich stream; and optionally transferring the 1-4 cycle heterocyclic-compound lean stream from the extraction vessel as a feed stream derived from the hydrocarbon feedstock to an additional extraction vessel for extraction of an additional targeted portion of heteroatom compounds from the feed stream.

A twelfth aspect includes the method of the eleventh aspect, in which: tuning the aqueous solvent system comprises establishing an extraction pressure and an extraction temperature of the extraction mixture in the extraction vessel that together tune the aqueous solvent to selectively form a solvent complex with the targeted portion of the 1-4 cycle heterocyclic compounds; the extraction pressure is from 2 bar to 300 bar; and the extraction temperature of the extraction mixture is from greater than the critical temperature of carbon dioxide to 150° C.

A thirteenth aspect includes the method of the first aspect, in which extracting the 2-5 cycle polynuclear aromatic hydrocarbons comprises: combining the 1-4 cycle heterocyclic-compound lean phase with the solvent system in the PAH extractor, whereby the 1-4 cycle heterocyclic-compound lean phase separates into a PAH-rich phase and a PAH-lean phase, the PAH-rich phase comprising a mixture of polynuclear aromatic hydrocarbons; removing the PAH-rich phase from the PAH extractor as a PAH recovery stream; and removing the PAH-lean phase from the PAH extractor as a lean raffinate.

A fourteenth aspect includes the method of the thirteenth aspect, further comprising: transferring the PAH recovery stream to a PAH fractionator; separating the mixture of polynuclear aromatic hydrocarbons in the PAH recovery stream in the PAH fractionator into multiple PAH solute fractions; and recovering polynuclear aromatic hydrocarbons from the PAH solute fractions.

A fifteenth aspect includes the method of the first aspect, in which: the heteroatom compounds comprise pyrrole, pyridine, quinoline, carbazole, indole, nickel tetraphenylporphyrin, vanadyl tetraphenylporphyrin, thiophene, benzothiophene, dibenzothiophene, 7,8,9,10-tetrahydro-benzo[b]naphtho[2,3-d]thiophene, or combinations thereof; and the 2-4 cycle polynuclear aromatic hydrocarbons comprise benzanthracenes, naphthalenes, anthracenes, pyrenes, phenanthrenes, tetracenes, or combinations thereof.

A sixteenth aspect includes a method of extracting 1-4 cycle heterocyclic compounds and 2-5 cycle polynuclear aromatic hydrocarbons from a hydrocarbon feedstock, the method comprising: providing a hydrocarbon feedstock comprising having an A/R ratio from 0:1 to 0.5:1 and an asphaltene concentration from 0.0 wt. % to 2 wt. %, the hydrocarbon feedstock containing crude oil fractions comprising 1-4 cycle heterocyclic compounds and 2-5 cycle polynuclear aromatic hydrocarbons; cracking hydrocarbon feedstock in a cracker to form a treated hydrocarbon feedstock comprising fractions having a boiling point range of 165° C. to 470° C.; fractionating the treated hydrocarbon feedstock into a first fractionated stream having a boiling point range of less than 165° C., a second fractionated stream having a boiling point range of 165° C. to 470° C., and a third fractionated stream having a boiling point range of greater than 470° C.; extracting at least one targeted portion of the 1-4 cycle heterocyclic compounds from the second fractionated stream with an aqueous solvent comprising an ionic liquid formed from pressurized carbon dioxide and water; transferring to a PAH extractor a 1-4 cycle heterocyclic compound-lean stream containing the 2-5 cycle polynuclear aromatic hydrocarbons after all targeted portions of the 1-4 cycle heterocyclic compounds have been extracted from the second fractionated stream; and extracting the 2-5 cycle polynuclear aromatic hydrocarbons from the heteroatom-lean stream in the PAH extractor with a solvent system comprising an aprotic solvent.

A seventeenth aspect includes the method of the sixteenth aspect, in which the treated hydrocarbon feedstock comprises greater than 90% by weight fractions having a boiling point range of less than 470° C.

An eighteenth aspect includes the method of the sixteenth aspect, in which the cracking step comprises thermal cracking, steam cracking, or catalytic cracking.

A nineteenth aspect includes the method of the sixteenth aspect, in which extracting at least one targeted portion of the 1-4 cycle heterocyclic compounds from the second fractionated stream comprises: extracting a first targeted portion of the 1-4 cycle heterocyclic compounds having a first polarity in a first extraction vessel operating at a first pressure; extracting a second targeted portion of the 1-4 cycle heterocyclic compounds in a second extraction vessel after extracting the first portion, the second extraction vessel operating at a second pressure greater than the first pressure, the second portion of the heteroatom compounds having a second polarity that is less than the first polarity; and extracting a third targeted portion of the 1-4 cycle heterocyclic compounds in a third extraction vessel after extracting the second portion of the 1-4 cycle heterocyclic compounds, the third extraction vessel operating at a third pressure greater than the first pressure and the second pressure, the third portion of the 1-4 cycle heterocyclic compounds having a third polarity lesser that is less than the second polarity.

A twentieth aspect includes the method of the first aspect, in which extracting the 2-5 cycle polynuclear aromatic hydrocarbons comprises: combining the 1-4 cycle heterocyclic-compound lean phase with the solvent system in the PAH extractor, whereby the 1-4 cycle heterocyclic-compound lean phase separates into a PAH-rich phase and a PAH-lean phase, the PAH-rich phase comprising a mixture of polynuclear aromatic hydrocarbons; removing the PAH-rich phase from the PAH extractor as a PAH recovery stream; and removing the PAH-lean phase from the PAH extractor as a lean raffinate.

It should be apparent to those skilled in the art that various modifications and variations can be made to the embodiments described in this disclosure without departing from the spirit and scope of the claimed subject matter. Thus it is intended that the specification cover the modifications and variations of the various embodiments described in this disclosure provided such modification and variations come within the scope of the appended claims and their equivalents.

What is claimed is:

1. A method of extracting 1-4 cycle heterocyclic compounds and 2-5 cycle polynuclear aromatic hydrocarbons from a hydrocarbon feedstock, the method comprising:

providing a hydrocarbon feedstock containing crude oil fractions comprising 1-4 cycle heterocyclic compounds and 2-5 cycle polynuclear aromatic hydrocarbons;

determining an A/R ratio and an asphaltene concentration of the hydrocarbon feedstock;

treating the hydrocarbon feedstock based upon the determination of the A/R ratio and asphaltene concentration to form a treatable hydrocarbon feedstock comprising fractions with a boiling point range of greater than 360° C.;

cracking the treatable hydrocarbon feedstock in a cracker to form a treated hydrocarbon feedstock comprising fractions having a boiling point range of 165° C. to 470° C.;

fractionating the treated hydrocarbon feedstock into a first fractionated stream having a boiling point range of less than 165° C., a second fractionated stream having a boiling point range of 165° C. to 470° C., and a third fractionated stream having a boiling point range of greater than 470° C.;

extracting at least one targeted portion of the 1-4 cycle heterocyclic compounds from the second fractionated stream with an aqueous solvent comprising an ionic liquid formed from pressurized carbon dioxide and water;

transferring to a PAH extractor a 1-4 cycle heterocyclic compound-lean stream containing the 2-5 cycle polynuclear aromatic hydrocarbons after all targeted portions of the 1-4 cycle heterocyclic compounds have been extracted from the second fractionated stream; and extracting the 2-5 cycle polynuclear aromatic hydrocarbons from the heteroatom-lean stream in the PAH extractor with a solvent system comprising an aprotic solvent.

2. The method of claim 1, in which the treated hydrocarbon feedstock comprises greater than 90% by weight fractions having a boiling point range of less than 470° C.

3. The method of claim 1, in which the hydrocarbon feedstock comprises at least one of heavy crude oil fractions, medium crude oil fractions, and mixtures thereof.

4. The method of claim 1, in which the cracking step comprises thermal cracking, steam cracking, or catalytic cracking.

5. The method of claim 1, in which the cracking step comprises catalytic cracking with a zeolite catalyst.

6. The method of claim 1, in which:

the hydrocarbon feedstock is determined to have an A/R ratio from 0.5:1 to 1.5:1 and an asphaltene concentration from 2.0 wt. % to 15 wt. %; and treating the hydrocarbon feedstock comprises:

fractionating the hydrocarbon feedstock in a vacuum fractionator to form a first hydrocarbon stream with fractions having a boiling point range of 360° C. to 470° C. and a second hydrocarbon stream with fractions having a boiling point range of greater than 470° C.;

deasphalting the second hydrocarbon stream in a solvent deasphalter to form a deasphalted oil stream and an asphalt fraction; and hydrocracking the deasphalted oil stream in a mild hydrocracker to form the treatable hydrocarbon feedstock.

7. The method of claim 6, in which the hydrocracking step is conducted at a pressure from 4 MPa to 16 MPa and a temperature from 330° C. to 440° C.

8. The method of claim 1, in which:
the hydrocarbon feedstock is determined to have an A/R ratio from 0:1 to 0.5:1 and an asphaltene concentration from 0.0 wt. % to 2.0 wt. %; and
treating the hydrocarbon feedstock comprises fractionating the hydrocarbon feedstock in a fractionator to form the treatable hydrocarbon stream having fractions with a boiling point range of greater than 360° C. and a second hydrocarbon stream having fractions with a boiling point range of less than 360° C.

9. The method of claim 1, in which:
the hydrocarbon feedstock is determined to have an A/R ratio from 0:1 to 0.5:1 and an asphaltene concentration from 0.0 wt. % to 2.0 wt. %; and
treating the hydrocarbon feedstock comprises fractionating the hydrocarbon feedstock to form a first fractionated stream having fractions with a boiling point range of less than 360° C. and the treatable feedstock having fractions with a boiling point range of greater than or equal to 360° C.

10. The method of claim 1, in which extracting at least one targeted portion of the 1-4 cycle heterocyclic compounds from the second fractionated stream comprises:
extracting a first targeted portion of the 1-4 cycle heterocyclic compounds having a first polarity in a first extraction vessel operating at a first pressure;
extracting a second targeted portion of the 1-4 cycle heterocyclic compounds in a second extraction vessel after extracting the first portion, the second extraction vessel operating at a second pressure greater than the first pressure, the second portion of the heteroatom compounds having a second polarity that is less than the first polarity; and
extracting a third targeted portion of the 1-4 cycle heterocyclic compounds in a third extraction vessel after extracting the second portion of the 1-4 cycle heterocyclic compounds, the third extraction vessel operating at a third pressure greater than the first pressure and the second pressure, the third portion of the 1-4 cycle heterocyclic compounds having a third polarity that is less than the second polarity.

11. The method of claim 1, in which the extraction of each targeted portion of the 1-4 cycle heterocyclic compounds from the second fractionated stream comprises:
feeding into an extraction vessel separately or as a mixture:
the second fractionated stream; and
the aqueous solvent,
whereby the combination of the second fractionated stream with the aqueous solvent in the extraction vessel forms an extraction mixture;
tuning the aqueous solvent to selectively form solvent complexes with the targeted portion of the 1-4 cycle heterocyclic compounds in the extraction mixture, whereby the extraction mixture separates into at least a 1-4 cycle heterocyclic-compound rich phase and a 1-4 cycle heterocyclic-compound lean phase, the 1-4 cycle heterocyclic-compound rich phase containing the solvent complexes;
removing the 1-4 cycle heterocyclic-compound lean phase from the extraction vessel as a 1-4 cycle heterocyclic-compound lean stream;
removing the 1-4 cycle heterocyclic-compound rich phase from the extraction vessel as a 1-4 cycle heterocyclic-compound rich stream; and
optionally transferring the 1-4 cycle heterocyclic-compound lean stream from the extraction vessel as a feed stream derived from the hydrocarbon feedstock to an additional extraction vessel for extraction of an additional targeted portion of heteroatom compounds from the feed stream.

12. The method of claim 11, in which:
tuning the aqueous solvent system comprises establishing an extraction pressure and an extraction temperature of the extraction mixture in the extraction vessel that together tune the aqueous solvent to selectively form a solvent complex with the targeted portion of the 1-4 cycle heterocyclic compounds;
the extraction pressure is from 2 bar to 300 bar; and
the extraction temperature of the extraction mixture is from greater than the critical temperature of carbon dioxide to 150° C.

13. The method of claim 1, in which extracting the 2-5 cycle polynuclear aromatic hydrocarbons comprises:
combining the 1-4 cycle heterocyclic-compound lean phase with the solvent system in the PAH extractor, whereby the 1-4 cycle heterocyclic-compound lean phase separates into a PAH-rich phase and a PAH-lean phase, the PAH-rich phase comprising a mixture of polynuclear aromatic hydrocarbons;
removing the PAH-rich phase from the PAH extractor as a PAH recovery stream; and
removing the PAH-lean phase from the PAH extractor as a lean raffinate.

14. The method of claim 13, further comprising:
transferring the PAH recovery stream to a PAH fractionator;
separating the mixture of polynuclear aromatic hydrocarbons in the PAH recovery stream in the PAH fractionator into multiple PAH solute fractions; and
recovering polynuclear aromatic hydrocarbons from the PAH solute fractions.

15. The method of claim 1, in which:
the heteroatom compounds comprise pyrrole, pyridine, quinoline, carbazole, indole, nickel tetraphenylporphyrin, vanadyl tetraphenylporphyrin, thiophene, benzothiophene, dibenzothiophene, 7,8,9,10-tetrahydro-benzo[b]naphtho[2,3-d]thiophene, or combinations thereof; and
the 2-4 cycle polynuclear aromatic hydrocarbons comprise benzanthracenes, naphthalenes, anthracenes, pyrenes, phenanthrenes, tetracenes, or combinations thereof.

16. A method of extracting 1-4 cycle heterocyclic compounds and 2-5 cycle polynuclear aromatic hydrocarbons from a hydrocarbon feedstock, the method comprising:
providing a hydrocarbon feedstock comprising an A/R ratio from 0:1 to 0.5:1 and an asphaltene concentration from 0.0 wt. % to 2.0 wt. %, the hydrocarbon feedstock containing crude oil fractions comprising 1-4 cycle heterocyclic compounds and 2-5 cycle polynuclear aromatic hydrocarbons;
cracking hydrocarbon feedstock in a cracker to form a treated hydrocarbon feedstock comprising fractions having a boiling point range of 165° C. to 470° C.;
fractionating the treated hydrocarbon feedstock into a first fractionated stream having a boiling point range of less than 165° C., a second fractionated stream having a boiling point range of 165° C. to 470° C., and a third fractionated stream having a boiling point range of greater than 470° C.;
extracting at least one targeted portion of the 1-4 cycle heterocyclic compounds from the second fractionated stream with an aqueous solvent comprising an ionic liquid formed from pressurized carbon dioxide and water;

transferring to a PAH extractor a 1-4 cycle heterocyclic compound-lean stream containing the 2-5 cycle polynuclear aromatic hydrocarbons after all targeted portions of the 1-4 cycle heterocyclic compounds have been extracted from the second fractionated stream; and extracting the 2-5 cycle polynuclear aromatic hydrocarbons from the heteroatom-lean stream in the PAH extractor with a solvent system comprising an aprotic solvent.

17. The method of claim 16, in which the treated hydrocarbon feedstock comprises greater than 90% by weight fractions having a boiling point range of less than 470° C.

18. The method of claim 16, in which the cracking step comprises thermal cracking, steam cracking, or catalytic cracking.

19. The method of claim 16, in which extracting at least one targeted portion of the 1-4 cycle heterocyclic compounds from the second fractionated stream comprises:

extracting a first targeted portion of the 1-4 cycle heterocyclic compounds having a first polarity in a first extraction vessel operating at a first pressure;

extracting a second targeted portion of the 1-4 cycle heterocyclic compounds in a second extraction vessel after extracting the first portion, the second extraction vessel operating at a second pressure greater than the first pressure, the second portion of the heteroatom compounds having a second polarity that is less than the first polarity; and extracting a third targeted portion of the 1-4 cycle heterocyclic compounds in a third extraction vessel after extracting the second portion of the 1-4 cycle heterocyclic compounds, the third extraction vessel operating at a third pressure greater than the first pressure and the second pressure, the third portion of the 1-4 cycle heterocyclic compounds having a third polarity lesser that is less than the second polarity.

20. The method of claim 1, in which extracting the 2-5 cycle polynuclear aromatic hydrocarbons comprises:

combining the 1-4 cycle heterocyclic-compound lean phase with the solvent system in the PAH extractor, whereby the 1-4 cycle heterocyclic-compound lean phase separates into a PAH-rich phase and a PAH-lean phase, the PAH-rich phase comprising a mixture of polynuclear aromatic hydrocarbons;

removing the PAH-rich phase from the PAH extractor as a PAH recovery stream; and removing the PAH-lean phase from the PAH extractor as a lean raffinate.

* * * * *